US012432292B2

(12) United States Patent
Barton et al.

(10) Patent No.: US 12,432,292 B2
(45) Date of Patent: Sep. 30, 2025

(54) HANDHELD ELECTRONIC DEVICE

(71) Applicant: Apple Inc., Cupertino, CA (US)

(72) Inventors: Jacob Barton, Campbell, CA (US);
Kevin Y. Chung, San Jose, CA (US);
Shayla A. Schoensee, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/243,548

(22) Filed: Sep. 7, 2023

(65) Prior Publication Data

US 2024/0256003 A1 Aug. 1, 2024

Related U.S. Application Data

(60) Provisional application No. 63/441,756, filed on Jan. 27, 2023.

(51) Int. Cl.
G06F 1/16 (2006.01)
G06F 1/18 (2006.01)
G06T 7/50 (2017.01)
G06V 40/16 (2022.01)
H04M 1/02 (2006.01)
(Continued)

(52) U.S. Cl.
CPC ........ *H04M 1/0266* (2013.01); *G06F 1/1643* (2013.01); *G06F 1/1656* (2013.01); *G06F 1/1683* (2013.01); *G06F 1/169* (2013.01); *G06F 1/181* (2013.01); *G06T 7/50* (2017.01); *G06V 40/161* (2022.01); *G06V 40/172* (2022.01); *H04M 1/0262* (2013.01); *H04M 1/0264* (2013.01); *H04M 1/0268* (2013.01); *H04M 1/0283* (2013.01); *H04M 1/22* (2013.01); *H04M 1/724631* (2022.02); *H04M 1/72466* (2021.01); *H04N 23/90* (2023.01); *G06T 2207/10028* (2013.01); *H04M 2201/38* (2013.01); *H04M 2207/18* (2013.01)

(58) Field of Classification Search
None
See application file for complete search history.

(56) References Cited

U.S. PATENT DOCUMENTS 2,866,141 A 12/1958 Frank et al.
4,037,068 A 7/1977 Gaynor
(Continued)

FOREIGN PATENT DOCUMENTS

EP 2720129 4/2014
JP 3034908 3/1997
KR 20080045397 5/2008

*Primary Examiner* — Matthew Yeung
(74) *Attorney, Agent, or Firm* — Brownstein Hyatt Farber Schreck, LLP

(57) ABSTRACT

An electronic device may include an input button assembly including an input member positioned along a side exterior surface of a housing component and defining a first input region proximate a first end of the input member and a second input region proximate a second end of the input member, the input member configured to receive a user input. The input button assembly may further include a beam structure at least partially within the enclosure and coupled to the input member, the beam structure configured to be deflected as a result of the user input, a first strain sensing element at a first location of the beam structure, and a second strain sensing element at a second location of the beam structure.

20 Claims, 13 Drawing Sheets

(51) Int. Cl.
  *H04M 1/22* (2006.01)
  *H04M 1/72463* (2021.01)
  *H04M 1/72466* (2021.01)
  *H04N 23/90* (2023.01)

(56) References Cited

U.S. PATENT DOCUMENTS

| | | |
|---|---|---|
| 4,258,096 A | 3/1981 | LaMarche |
| 4,324,956 A | 4/1982 | Sakakino et al. |
| 4,345,119 A | 8/1982 | Latasiewicz |
| 4,581,509 A | 4/1986 | Sanford et al. |
| 4,922,070 A | 5/1990 | Dorkinski |
| 5,258,592 A | 11/1993 | Nishikawa et al. |
| 5,584,380 A | 12/1996 | Naitou |
| 5,657,012 A | 8/1997 | Tait |
| 6,344,791 B1 | 2/2002 | Armstrong |
| 6,355,891 B1 | 3/2002 | Ikunami |
| 6,525,278 B2 | 2/2003 | Villain et al. |
| 6,963,039 B1 | 11/2005 | Weng et al. |
| 7,119,289 B2 | 10/2006 | Lacroix |
| 7,388,167 B2 | 6/2008 | Liao et al. |
| 8,167,126 B2 | 5/2012 | Stiehl |
| 8,248,815 B2 | 8/2012 | Yang et al. |
| 8,263,886 B2 | 9/2012 | Lin et al. |
| 8,263,889 B2 | 9/2012 | Takahashi et al. |
| 8,432,368 B2 | 4/2013 | Momeyer et al. |
| 8,446,713 B2 | 5/2013 | Lai |
| 8,576,044 B2 | 11/2013 | Chapman |
| 8,648,829 B2 | 2/2014 | Shahoian et al. |
| 8,885,856 B2 | 11/2014 | Sacha |
| 9,058,941 B2 | 6/2015 | Malek et al. |
| 9,064,654 B2 | 6/2015 | Whitt et al. |
| 9,089,049 B2 | 7/2015 | Perrault et al. |
| 9,263,204 B2 | 2/2016 | Rivera |
| 9,449,770 B2 | 9/2016 | Sanford et al. |
| 9,510,468 B2 | 11/2016 | Schack et al. |
| 9,627,163 B2 | 4/2017 | Ely et al. |
| 9,871,330 B2 | 1/2018 | Seo et al. |
| 9,916,942 B2 | 3/2018 | Shedletsky |
| 9,949,395 B2 | 4/2018 | Jung et al. |
| 10,002,731 B2 | 6/2018 | Wang et al. |
| 10,018,966 B2 | 7/2018 | Ely et al. |
| 10,775,889 B1 * | 9/2020 | Lehmann .................. G01L 1/16 |
| 10,831,299 B1 | 11/2020 | Lukens et al. |
| 11,025,761 B1 * | 6/2021 | Shim .................. H04M 1/0202 |
| 2004/0082414 A1 | 4/2004 | Knox |
| 2007/0152959 A1 | 7/2007 | Peters |
| 2008/0049980 A1 | 2/2008 | Castaneda et al. |
| 2009/0312051 A1 | 12/2009 | Hansson et al. |
| 2012/0067711 A1 | 3/2012 | Yang |
| 2013/0037396 A1 | 2/2013 | Yu |
| 2013/0087443 A1 | 4/2013 | Kikuchi |
| 2015/0199011 A1 | 7/2015 | Fukumoto et al. |
| 2015/0221460 A1 | 8/2015 | Teplitxky et al. |
| 2017/0069443 A1 | 3/2017 | Wang et al. |
| 2017/0069444 A1 | 3/2017 | Wang et al. |
| 2017/0351349 A1 | 12/2017 | Fassett |
| 2018/0005496 A1 | 1/2018 | Dogiamis |
| 2018/0081400 A1 | 3/2018 | Pandya et al. |
| 2018/0307361 A1 | 10/2018 | Park |
| 2021/0132728 A1 * | 5/2021 | Hwang .................. G06F 1/169 |

* cited by examiner

HANDHELD ELECTRONIC DEVICE

CROSS-REFERENCE TO RELATED APPLICATION(S)

This application is a nonprovisional patent application of and claims the benefit of U.S. Provisional Patent Application No. 63/441,756, filed Jan. 27, 2023 and titled "Handheld Electronic Device," the disclosure of which is hereby incorporated herein by reference in its entirety.

FIELD

The subject matter of this disclosure relates generally to handheld electronic devices.

BACKGROUND

Modern consumer electronic devices take many shapes and forms, and have numerous uses and functions. For example, a tablet computer may include a touch-sensitive display for providing graphical outputs and for accepting touch inputs, wireless communications systems for connecting with other devices to send and receive data and voice content, cameras for capturing photographs and videos, and so forth. Input devices may provide user control of certain device functions and settings.

SUMMARY

An electronic device may include an enclosure including a front cover defining a front exterior surface of the electronic device and a housing component coupled to the front cover and defining a side exterior surface of the electronic device. The electronic device may further include an input button assembly including an input member positioned along the side exterior surface of the housing component and defining a first input region proximate a first end of the input member and a second input region proximate a second end of the input member, the input member configured to receive a user input. The input button assembly may further include a beam structure at least partially within the enclosure and coupled to the input member, the beam structure configured to be deflected as a result of the user input, a first strain sensing element at a first location of the beam structure, and a second strain sensing element at a second location of the beam structure. The electronic device may further include a processing system within the enclosure and configured to determine whether the user input was applied to the first input region or the second input region based at least in part on at least one of a first signal from the first strain sensing element or a second signal from the second strain sensing element.

The user input may cause the input member to move inwards a first distance, and the processing system may be further configured to determine whether an output of a sensing system including the first strain sensing element and the second strain sensing element satisfies a condition, and the electronic device may further include a haptic actuation system integrated with the input button assembly and configured to, in accordance with a determination that the output of the sensing system satisfies the condition, cause the input member to move inwards a second distance greater than the first distance. The electronic device may further include a ferromagnetic structure set apart from the beam structure by a gap, the haptic actuation system may include a conductive coil coupled to the beam structure, and the haptic actuation system may energize the conductive coil to cause the beam structure to be deflected towards a ferromagnetic structure, thereby causing the input member to move inwards the second distance.

The processing system may be configured to, in accordance with a determination that the user input was applied to the first input region, increase an audio output volume of the electronic device, and in accordance with a determination that the user input was applied to the second input region, decrease an audio output volume of the electronic device.

The beam structure may include an actuation segment including an electromagnetic element, a first compliant segment on a first side of the actuation segment, and a second compliant segment on a second side of the actuation segment. The first strain sensing element may be coupled to the first compliant segment, and the second strain sensing element may be coupled to the second compliant segment. The actuation segment may include a ferrous member and a conductive coil surrounding the ferrous member. The beam structure may be rigidly coupled to the housing component at a first end of the beam structure via a first fastener and at a second end of the beam structure by a second fastener. The beam structure may be coupled to the input member via a third fastener extending through the beam structure on a first side of the actuation segment and via a fourth fastener extending through the beam structure on a second side of the actuation segment.

A portable electronic device may include a touchscreen display, wireless communication circuitry, a battery, and an enclosure enclosing the touchscreen display, the wireless communication circuitry, and the battery. The enclosure may include a front cover positioned over the touchscreen display and defining a front exterior surface of the enclosure, and a housing component coupled to the front cover and defining an opening along a side exterior surface of the enclosure. The portable electronic device may further include an input button assembly including a beam structure at least partially within the enclosure and including an actuation segment including an electromagnetic element and positioned proximate a middle of the beam structure, a first compliant segment positioned proximate a first end of the beam structure, and a second compliant segment positioned proximate a second end of the beam structure. The input button assembly may further include an input member positioned at least partially in the opening and configured to impart a force on the beam structure as a result of an input applied to the input member. The portable electronic device may further include a sensing system configured to detect a deflection of at least one of the first compliant segment or the second compliant segment and a processing system within the enclosure and configured to, in accordance with a determination that an output of the sensing system satisfies a condition, cause the electromagnetic element to deflect the beam structure, thereby moving the input member to produce a haptic output.

The condition may be a first condition, and the processing system may be configured to, in accordance with the determination that the output of the sensing system satisfies the first condition, cause the electromagnetic element to deflect the beam structure a first distance, and in accordance with a determination that the output of the sensing system satisfies a second condition different from the first condition, cause the electromagnetic element to deflect the beam structure a second distance greater than the first distance. The first condition may be indicative of the input member being depressed a third distance, and the second condition may be indicative of the input member being depressed a fourth distance greater than the third distance.

The sensing system may further include a first strain sensing element coupled to the first compliant segment, and a second strain sensing element coupled to the second compliant segment. The input may be a first input, and the processing system may be further configured to determine a swipe direction of a second input applied to the input member based at least in part on a first signal from the first strain sensing element and a second signal from the second strain sensing element, the second input including a swipe gesture extending along a surface of the input member.

Causing the electromagnetic element to deflect the beam structure may cause the beam structure to move the input member in a same direction as the input applied to the input member.

The input button assembly may further include a ferromagnetic structure, and causing the electromagnetic element to deflect the beam structure may include causing the electromagnetic element to be magnetically attracted to the ferromagnetic structure.

An electronic device may include a housing component defining a side surface of the electronic device, a front cover coupled to the housing component, a display positioned below the front cover, and an input button assembly including a beam structure positioned within the electronic device, an input member positioned along the side surface of the electronic device and configured to move inward a first distance in response to a force input applied to the input member and cause a first deflection of the beam structure in response to the force input. The input button assembly may further include a haptic actuation system configured to, in accordance with a determination that the first deflection satisfies a condition, cause a second deflection of the beam structure, the second deflection configured to move the input member inward a second distance greater than the first distance.

The input member may define a first input region at a first end of the input member, a second input region at a second end of the input member opposite the first end, a first post extending below the first input region and coupled to the beam structure, and a second post extending below the second input region and coupled to the beam structure. The beam structure may include a first compliant segment rigidly coupled to the housing component, a second compliant segment rigidly coupled to the housing component, and an actuation segment between the first compliant segment and the second compliant segment. The haptic actuation system may include a conductive coil coupled to the actuation segment.

The first post may be coupled to the beam structure via a first fastener extending through a first hole formed through the first compliant segment and the actuation segment, and the second post may be coupled to the beam structure via a second fastener extending through a second hole formed through the second compliant segment and the actuation segment.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Portable electronic devices as described herein may include complex, sophisticated components and systems that facilitate a multitude of functions. For example, portable electronic devices according to the instant disclosure may include touch- and/or force-sensitive displays, numerous cameras (including both front- and rear-facing cameras), GPS systems, haptic actuators, wireless charging systems, and all requisite computing components and software to operate these (and other) systems and otherwise provide the functionality of the devices.

Figure 1A:
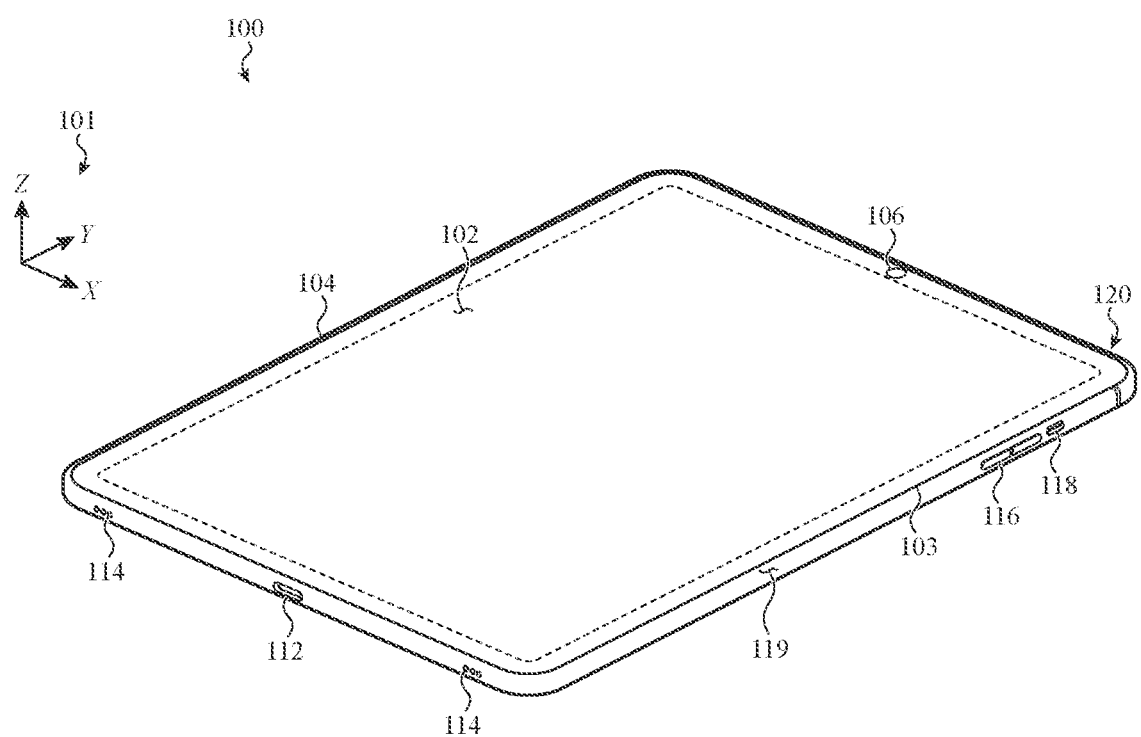
FIGS. 1A-1C depict an example electronic device.
Figure 1B:
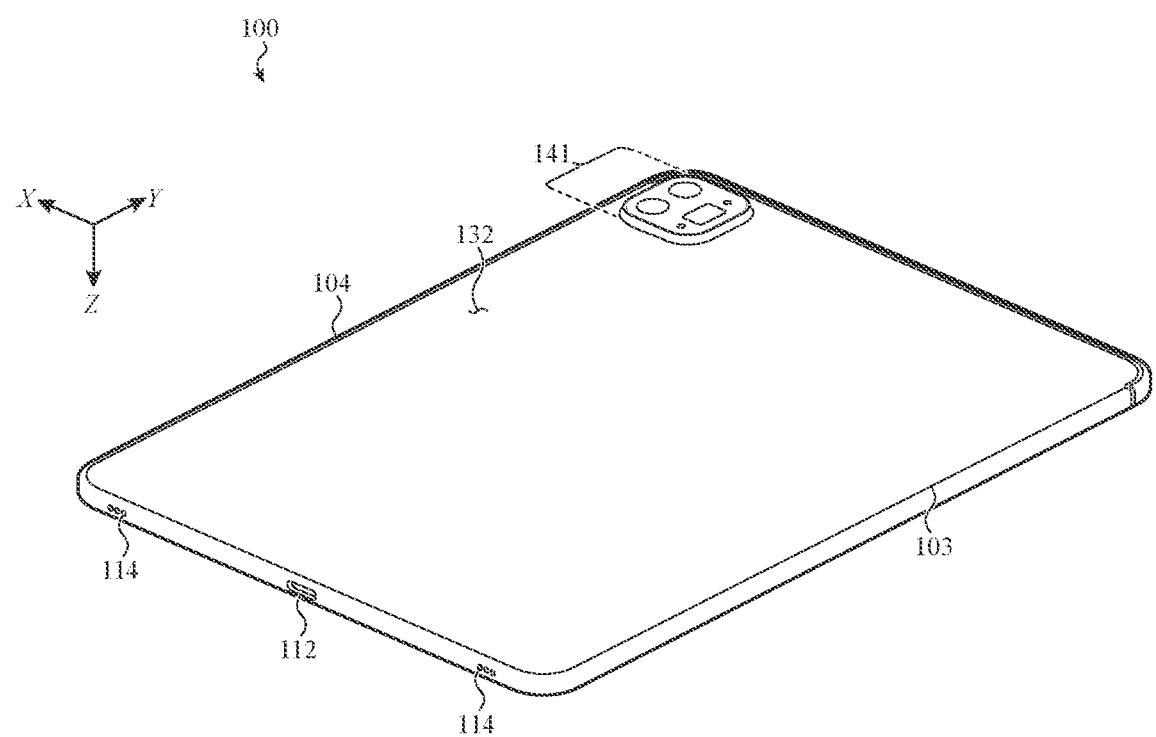

FIGS. 1A and 1B show an example electronic device 100 embodied as a tablet computer. FIG. 1A illustrates a front of the device 100, while FIG. 1B illustrates a back side of the device. While the device 100 is a tablet computer, the concepts presented herein may apply to any appropriate electronic devices, including portable electronic devices, wearable devices (e.g., watches), laptop computers, mobile phones, handheld gaming devices, computing peripherals (e.g., mice, touchpads, keyboards), or any other device. Accordingly, any reference to an "electronic device" encompasses any and all of the foregoing.

The electronic device 100 includes a cover 102 (e.g., a front cover) attached to a housing 104 (which may include a housing structure defined by one or more housing components). The cover 102 may be positioned over a display 103. The cover 102 may be a sheet or sheet-like structure formed from or including a transparent or optically transmissive material. In some cases, the cover 102 is formed from or includes a glass material and may therefore be referred to as a glass cover member. The glass material may be a silica-based glass material, an aluminosilicate glass, a boroaluminosilicate glass, an alkali metal aluminosilicate glass (e.g., a lithium aluminosilicate glass), or a chemically strengthened glass. Other example materials for the cover 102 include, without limitation, sapphire, ceramic, glass-ceramic, crystallizable glass materials, or plastic (e.g., polycarbonate). A glass-ceramic material may be a silica-based glass ceramic material, such as an aluminosilicate glass ceramic material or a boroaluminosilicate glass ceramic material. The glass-ceramic material may be chemically strengthened by ion exchange. The cover 102 may be formed as a monolithic or unitary sheet. The cover 102 may also be formed as a composite of multiple layers of different materials, coatings, and other elements.

The display 103 may be at least partially positioned within the interior volume of the housing 104. The display 103 may be coupled to the cover 102, such as via an adhesive or other coupling scheme. The display 103 may include a liquid-crystal display (LCD), a light-emitting diode (LED) display, an organic light-emitting diode (OLED) display, an active layer organic light-emitting diode (AMOLED) display, an organic electroluminescent (EL) display, an electrophoretic ink display, or the like. The display 103 may be configured to display graphical outputs, such as graphical user interfaces, that the user may view and interact with. Graphical outputs may be displayed in a graphically active region of the display 103 (e.g., an active display region). The display 103 may also define a primary display region, which may generally correspond to the main front-facing, contiguous display region, in which graphical user interfaces, images, videos, applications, and other graphical outputs may be displayed.

The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor). The ambient light sensor may be positioned below an active area of the display 103 (e.g., below a portion of the display that produces graphical output). The ambient light sensor may transmit and/or receive light through the active area of the display 103 to perform sensing functions.

The display 103 may include or be associated with one or more touch- and/or force-sensing systems. In some cases, components of the touch- and/or force-sensing systems are integrated with the display stack. For example, touch-sensing components such as electrode layers of a touch and/or force sensor may be provided in a stack that includes display components (and is optionally attached to or at least viewable through the cover 102). The touch- and/or force-sensing systems may use any suitable type of sensing technology and touch-sensing components, including capacitive sensors, resistive sensors, surface acoustic wave sensors, piezoelectric sensors, strain gauges, or the like. The front exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system. A display that includes touch-sensing functionality may be referred to as a touchscreen or a touchscreen display.

The device 100 may also include a front-facing camera 106. The front-facing camera 106 may be positioned below or otherwise covered and/or protected by the cover 102. The front-facing camera 106 may have any suitable operational parameters. For example, the front-facing camera 106 may include a 12-megapixel sensor (with 1 micron pixel size), and an 80-90° field of view. The front-facing camera 106 may have an aperture number of f/1.9. The front-facing camera 106 may include auto-focus functionality (e.g., one or more lens elements may move relative to an optical sensor to focus an image on the sensor). Other types of cameras may also be used for the front-facing camera 106, such as a fixed-focus camera.

The device 100 may also include one or more buttons (such as buttons 116, 120), switches (such as switch 118), and/or other physical input systems. Such input systems may be used to control power and/or sleep/wake states (e.g., the button 120), change speaker volume (e.g., the button 116), switch between "ring" and "silent" modes (e.g., the switch 118), and the like. The buttons 116 and 120 may include strain-sensing systems that detect inputs to the buttons based on a detected strain. The buttons 116 and 120 may also be associated with haptic actuation systems that produce a tactile or haptic output in response to a detection of a strain that satisfies a condition. Thus, for example, upon detecting a strain that satisfies a condition (and/or an electrical parameter that is indicative of a strain satisfying the condition), a haptic actuation system may impart a force on a button to produce a tactile output (e.g., resembling a "click"). This tactile or haptic output may provide tactile feedback to the user to indicate that the input has been recognized by the device. In some cases, one or more of the buttons 116 and 120 may use switch members, such as collapsible dome switches, to detect button presses. In some cases, one or more of the buttons 116 and 120 may use touch-sensing systems, such as capacitive touch sensing systems, to detect inputs. Other sensing techniques may also be used to detect inputs to the buttons. In some cases, a switch or other input device is used in place of one or more of the buttons.

The switch 118 may be a toggle or bistable switch that is positionable in a first position and a second position. Changing the position of the switch 118 (e.g., between first and second positions) may cause the device to change its mode or operating state. For example, positioning the switch 118 in the first position may cause the device to operate in a "ring" mode (in which an audio output is produced in response to a notification such as an incoming call or message), and positioning the switch 118 in the second position may cause the device to operate in a "silent" mode (in which audio output is not produced in response to a notification such as an incoming call or message). (Other types of input systems may be used instead of a switch, such as a button.) In some cases, the change to the mode or operating state of the device as a result of an input to the switch 118 includes changing a plurality of device settings. For example, when the first mode may correspond to a general audio "active" mode in which the device produces audio outputs from various sources, including media, gaming applications, notifications, and the like. Further, the second mode may correspond to a reduced audio mode, in which the device does not produce audio in response to notifications or certain applications (e.g., gaming applications), but still allows audio output from media sources (e.g., videos). (In some cases, in the second mode, audio outputs from some sources, such as gaming applications, are converted to or replaced with haptic outputs.) Thus, switching from the "active" audio mode to the second mode may result in the modification of various different audio output and/or alert settings. Moreover, these are merely examples of settings that may be changed when the switch 118 is used to change the device mode.

In some cases, changing the device mode or operating state with the switch 118 may also affect haptic output settings. For example, switching from a first mode (e.g., a "ring" mode or audio "active" mode) to a second mode (e.g., a "silent" or "low audio" mode) may cause the device to replace certain audio outputs (e.g., incoming call notifications) with haptic outputs. Other settings may also be affected by the mode change that is effectuated by interacting with the switch 118.

The mode of the device (e.g., the ringer or audio mode) may also be selectable via the touchscreen. For example, the device 100 may provide options, via one or more graphical user interfaces displayed on the display 103, for controlling the audio mode (e.g., choosing between ring and silent modes) and/or selecting various notification parameters (e.g., ringer volume, ringtone, haptic output sequences, haptic intensity, haptic duration, and the like). Such settings may be accessed and selected via interactions with the touchscreen.

The device 100 may also include a charging port 112 (e.g., for receiving a connector of a power cable for providing power to the device 100 and charging the battery of the device 100). The charging port 112 may receive a connector of any suitable design. In some cases, the charging port 112 receives a connector corresponding to a USB connector type, such as a USB-C connector. The charging port 112 may also be configured to send and/or receive data via a cable, such as with a USB or other communication protocol.

The device 100 may also include audio openings 114. The audio openings 114 may allow sound output from an internal speaker system to exit the housing 104. The device 100 may also include one or more microphones. In some cases, a microphone within the housing 104 may be acoustically coupled to the surrounding environment through an audio opening 114.

FIG. 1A also includes an example coordinate system 101 that may define directions with reference to the device 100 (or other electronic devices described herein). The coordinate system 101 defines a positive x direction, a positive y direction, and a positive z direction. Unless stated otherwise, references herein to a positive x, positive y, or positive z direction will be understood to refer generally to the coordinate system 101 and its relationship to the device 100 in FIG. 1A. Negative x, y, and z directions will be understood to be opposite to the positive x, y, and z directions shown in the coordinate system in FIG. 1A.

FIG. 1B illustrates a back side of the device 100. The housing 104 may include or may define a rear exterior surface 132, and may included or define one or more side exterior surfaces 119. The cover 102 (e.g., the front cover) and the housing 104 may at least partially define an enclosure of the device 100. The enclosure may define an internal volume in which components of the device 100 are positioned. The rear surface 132 may be integral with the sides of the housing 104 (e.g., the back and at least some of the sides may be part of a single piece of material), or it may be defined by a separate member (e.g., a rear cover, which may be formed from glass, metal, polymer, composite, or any other suitable material). Where the rear surface 132 is defined by a separate member, the device 100 may include a band-shaped housing member that defines the sides of the enclosure, a front cover that defines the front surface, and a rear cover that defines the rear surface.

The device 100 may also include a sensor array 141 (e.g., a rear-facing sensor array in a rear-facing sensor array region) that includes one or more cameras (e.g., two cameras, as shown). The sensor array 141 may be in a sensor array region that is defined by a protrusion along the rear of the device 100. The protrusion may define a portion of the rear exterior surface of the device 100, and may at least partially define a raised sensor array region of the sensor array 141.

The sensor array 141, along with associated processors and software, may provide several image-capture features. For example, the sensor array 141 may be configured to capture full-resolution video clips of a certain duration each time a user captures a still image. As used herein, capturing full-resolution images (e.g., video images or still images) may refer to capturing images using all or substantially all of the pixels of an image sensor, or otherwise capturing images using the maximum resolution of the camera (regardless of whether the maximum resolution is limited by the hardware or software).

The captured video clips may be associated with the still image. In some cases, users may be able to select individual frames from the video clip as the representative still image associated with the video clip. In this way, when the user takes a snapshot of a scene, the camera will actually record a short video clip (e.g., 1 second, 2 seconds, or the like), and the user can select the exact frame from the video to use as the captured still image (in addition to simply viewing the video clip as a video).

The cameras of the sensor array 141 may also have or provide a high-dynamic-range (HDR) mode, in which the camera captures images having a dynamic range of luminosity that is greater than what is captured when the camera is not in the HDR mode. In some cases, the sensor array 141 automatically determines whether to capture images in an HDR or non-HDR mode. Such determination may be based on various factors, such as the ambient light of the scene, detected ranges of luminosity, tone, or other optical parameters in the scene, or the like. HDR images may be produced by capturing multiple images, each using different exposure or other image-capture parameters, and producing a composite image from the multiple captured images.

The sensor array 141 may also include or be configured to operate in an object detection mode, in which a user can select (and/or the device 100 can automatically identify) objects within a scene to facilitate those objects being processed, displayed, or captured differently than other parts of the scene. For example, a user may select (or the device 100 may automatically identify) a person's face in a scene, and the device 100 may focus on the person's face while selectively blurring the portions of the scene other than the person's face. Notably, features such as the HDR mode and the object detection mode may be provided with a single camera (e.g., a single lens and sensor).

The sensor array 141 may also include a depth sensing device that is configured to estimate a distance between the device and a separate object or target. The depth sensing device may estimate a distance between the device and a separate object or target using lasers and time-of-flight calculations, or using other types of depth sensing components or techniques.

The device 100 may also include a flash (e.g., a rear-facing flash) that is configured to illuminate a scene to facilitate capturing images with the cameras of the sensor array 141. The flash is configured to illuminate a scene to facilitate capturing images with the sensor array 141. The flash may include one or more light sources, such as one or more light-emitting diodes (e.g., 1, 2, 3, 4, or more LEDs).

The sensor array 141 may also include a microphone. The microphone may be acoustically coupled to the exterior environment through a hole defined in the rear cover of the device 100 (e.g., through the portion of the rear cover that defines the protrusion).

Figure 1C:
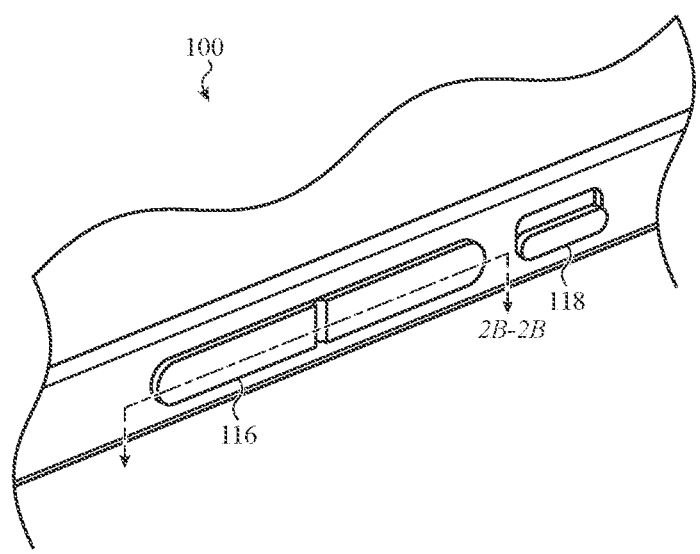

FIG. 1C illustrates a portion of the device 100 showing the input systems (e.g., button 116, switch 118) that may be provided along a side exterior surface of the device housing. The input systems may accept user inputs and cause the device 100 to perform one or more operations in response to the user inputs. For example, the button 116 may control a volume of the device by allowing a user to press on opposite ends of the button 116, and the switch 118 may toggle the device between ring and silent modes. The button 116 may use strain sensing and a haptic actuation system to detect inputs and provide tactile feedback to the user (e.g., instead of or optionally in addition to a collapsible dome switch). The switch 118 may be a toggle switch or any other suitable input system (e.g., levers, buttons, touch-sensitive surfaces, etc.).

Figure 2A:
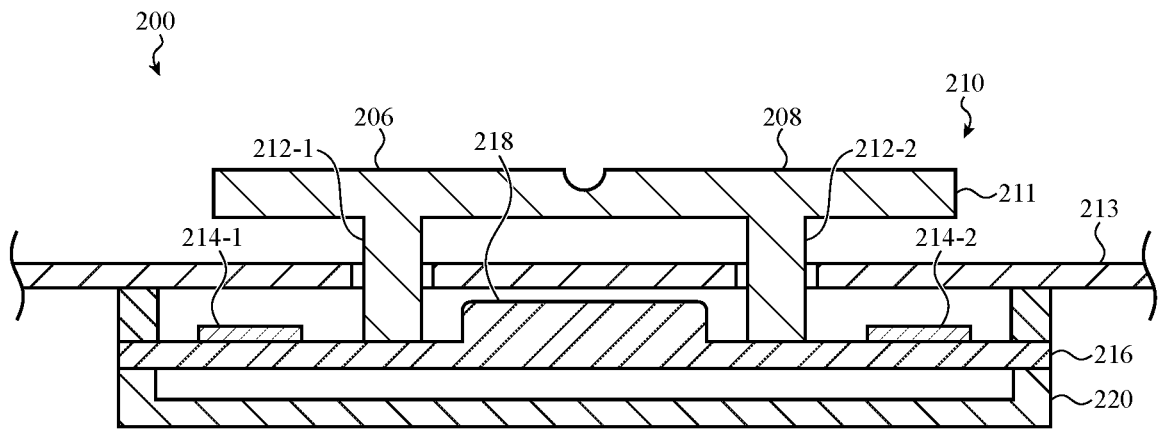
FIGS. 2A-2C depict a partial cross-sectional view of an example input button assembly.
Figure 2B:
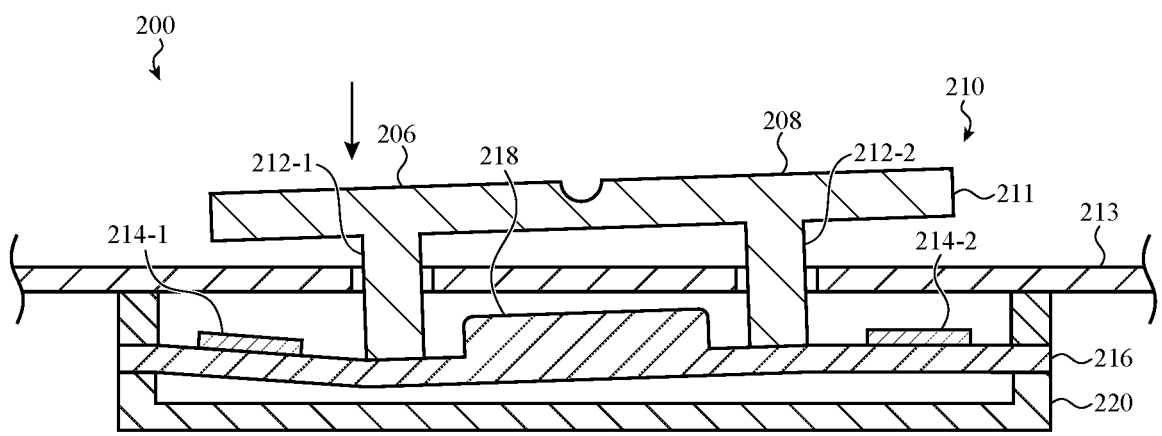
Figure 2C:
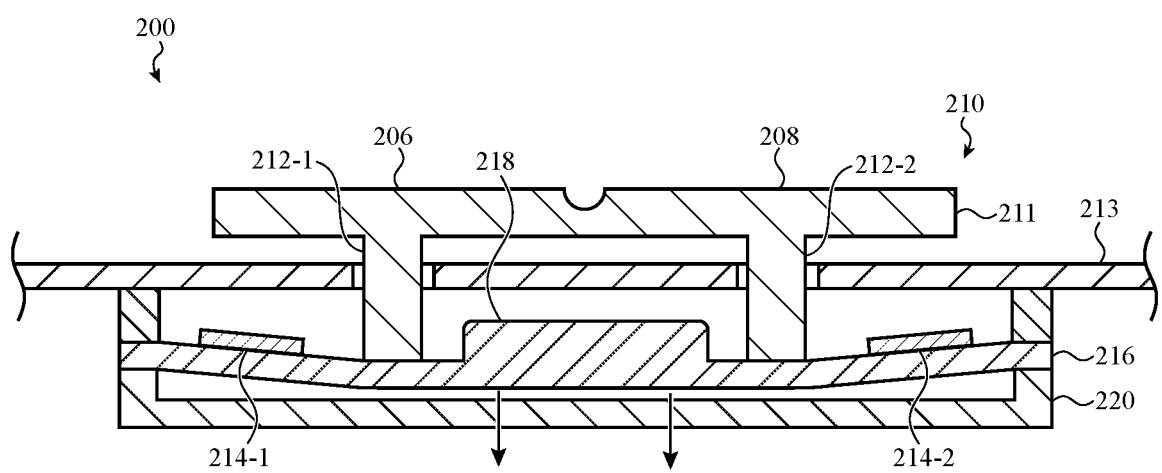

FIGS. 2A-2C depict partial cross-sectional views of a simplified example of a button 210 that uses a sensing system (e.g., a strain sensing system) and a haptic actuation system. The button 210 may be incorporated into a device 200 and may correspond to or be an embodiment of the button 116 in FIGS. 1A-1C, or any other buttons described herein. The device 200 may correspond to or be an embodiment of the device 100. The descriptions of the button 116 and the device 100 will be understood to apply equally to the button 210 and device 200.

The button 210 includes an input member 211. The input member 211 may define an interface or input surface that a user presses in order to actuate the button 210. The input member 211 may be configured as a dual-input button with different actuation regions 206, 208. When a user presses on the first actuation region 206, the device performs a first action (e.g., increasing a volume of an audio output that is controlled by the device 200), and when a user presses on the second actuation region 208, the device performs a second action (e.g., decreasing a volume of the audio output).

The input member 211 may include posts 212-1, 212-2 that extend through holes formed in the housing 213. The posts 212 are coupled to a beam structure 216 within the device. When the input member 211 is pushed, the input member 211 causes the beam structure 216 to deflect. The beam structure 216 may be constrained, relative to the housing 213, such that forces imparted on the beam structure 216 by the input member 211 (e.g., forces in a vertical direction relative to the orientation of FIG. 2A) cause the beam structure 216 to be deflected relative to the housing 213 and/or other components of the device. In some cases, one or both ends of the beam structure 216 are fixed relative to the housing 213 (and optionally relative to a ferromagnetic structure 220, described herein). In some cases, one or both ends of the beam structure 216 are constrained in one direction (e.g., vertical), but allow for some movement in another direction (e.g., horizontal). The ends of the beam structure 216 may be constrained in various ways, such as by fasteners that are coupled to the housing 213. In some cases, fasteners (e.g., screws) anchor fix one or both ends of the beam structure 216 to the housing 213 (e.g., the fasteners 322 described with respect to FIG. 3A).

The posts 212-1, 212-2 may be coupled to the beam structure 216 such that forces applied to the input member 211 may be transferred to the beam structure 216 (e.g., due to force inputs applied to the input member 211), and such that forces applied to the beam structure 216 (e.g., due to operation of a haptic actuation system) are transferred to the input member 211. Stated another way, the input member 211 may be at least partially constrained to the beam structure 216 in at least a vertical direction. As one example, the posts 212 may be coupled to the beam structure 216 by one or more fasteners, such as fasteners 324 described with respect to FIGS. 3A-3B. In some cases, the coupling between the posts 212 and the beam structure 216 allow some degree of compliance or relative movement between the posts 212 (and thus the input member 211) and the beam structure 216.

Sensing elements 214-1, 214-2 may be coupled to the beam structure 216 and may detect deflection of the beam structure 216 as a result of inputs to the input member 211. The sensing elements 214 may be or may include strain sensing elements (e.g., strain gauges, piezoelectric and/or piezoresistive materials, etc.), or other components or materials that detect deflection of the beam structure 216 (optionally in conjunction with other circuitry). The sensing elements 214 may produce a signal that varies continuously with the deflection of the beam structure 216 (e.g., as opposed to a collapsible switch that produces only a binary or discontinuous signal).

The beam structure 216 may bias the input member 211 into its undepressed or unactuated position, and may have a stiffness that provides a tactile resistance to the input force (such that the user can tactilely feel that they are pressing against a button that has some compliance while also providing some resistance). The tactile resistance may increase as the beam structure 216 is deflected, such that the user can feel the increasing resistance as the button is being pressed.

As shown in FIGS. 2A-2C, the posts 212-1, 212-2 are positioned generally under the actuation regions 206, 208, respectively. Thus, when an input force is applied to the actuation region 206, the input force may be predominantly transferred to the beam structure 216 proximate the sensing element 214-1, and may cause a greater deflection of the beam structure 216 at the location of the sensing element 214-1 as compared to the sensing element 214-2 (or otherwise produce a deflection having a measurable difference as compared to the deflection at the location of the sensing element 214-2). FIG. 2B illustrates the button 210 while an input force is applied to the actuation region 206, resulting in the beam structure 216 being deflected proximate the strain sensing element 214-1. The deflection shown in FIG. 2B is merely for illustration, and the actual deflection of the beam structure 216 in response to an input force on an actuation region may differ from that shown.

The device may determine, based at least in part on a first signal from a first sensing element 214-1 and a second signal from the second sensing element 214-2, a location of an input on the input member 211. For example, as noted above, forces applied to different locations on the input member 211 may result in different deflections at different locations of the beam structure 216 (which are detected using the first and second sensing elements 214). For example, a force input applied to a first actuation region 206 may result in greater deflection (or at least a different deflection) of the beam structure 216 below the first actuation region 206 (e.g., at the first sensing element 214-1) as compared to the portion of the beam structure 216 below the second actuation region 208 (e.g., at the second sensing element 214-2).

In some cases, the device may correlate different sets of signals from the sensing elements 214 to different force input locations. In this way, the device can differentiate between different inputs to a single input member of unitary construction. The device may perform different actions or operations based at least in part on the location of the input. For example, if the location of the input is determined to correspond to the first actuation region 206, the device may increase an audio output volume of the device, and if the location of the input is determined to correspond to the second actuation region 208, the device may decrease an audio output volume of the device. These are merely example operations, and other operations may be performed based on the location of the input on the input member. For example, when the button is being used to control image capture functions, an input applied to the first actuation region 206 may cause the device to perform a first zoom operation (e.g., zoom in) and an input applied to the second actuation region 208 may cause the device to perform a second zoom operation (e.g., zoom out). As yet another example, when the button is being used to control scrolling functions, an input applied to the first actuation region 206 may cause the device to scroll displayed graphical objects (e.g., on a touchscreen) in a first direction, and an input applied to the second actuation region 208 may cause the device to scroll displayed graphical objects in a second direction different than the first direction.

In some cases, the device may be capable of distinguishing input locations on the input member 211 to a resolution of about 1.0 mm, about 2.0 mm, about 3.0 mm, or another suitable resolution. In some cases, the device distinguishes the input locations to a greater resolution than is necessary for the button functions. For example, the device may determine the location of an input on the input member 211 to a resolution of about 1.0 mm. If the location is within a first region of the input member 211 (e.g., within an about 10 mm area defining the first actuation region 206), the device may perform a first operation, and if the location is within a second region of the input member 211 (e.g., within an about 10 mm area defining the second actuation region 208), the device may perform a second operation different from the first operation.

Because the device can determine the location of an input applied to the input member 211, the device may detect and respond to gesture inputs applied to the input member 211. As used herein, a gesture input may include a directional component, such as a swipe along length of the input member 211 (e.g., along the horizontal axis in FIG. 2A). As a user applies a gesture along the input surface of the input member 211 (e.g., the exterior surface that is contactable by a user), the device may determine one or more parameters of the gesture. Such parameters may include a direction of the gesture (e.g., a swipe direction), speed of the gesture, start/stop locations of the gesture, or the like. Such parameters may be determined based on the signals from the sensing elements 214, and may correspond to deflections of the beam structure 216. Thus, such gesture inputs may be detectable to the extent that they produce detectable deflections in the beam structure 216. While a swipe gesture is described, other types of gesture inputs or inputs that include directions and/or motions are also contemplated. For example, a user may apply a "rocking" gesture to the input member 211, where the entire input member 211 receives a force, but a primary force location (e.g., a centroid of the force input) changes with time (e.g., as if a user rocks a finger or thumb from the first actuation region 206 to the second actuation region 208). Because the deflection of the beam structure 216 changes in accordance with the location of the primary force location, parameters of such a gesture input may be determined and the device may perform operations based on the determined parameters.

Example operations that may be performed in response to gesture inputs include, without limitation, scrolling displayed objects, changing audio output volume, changing display brightness (or any other device parameters), locking and/or unlocking the device, sending an information item (e.g., sending an email or text message), refreshing content (e.g., refreshing a webpage), and the like.

As noted above, the device may determine a location of an input on the input member 211 based on one or more signals from the sensing elements 214. The signals may be or may correspond to an electrical signal and/or an electrical characteristic. For example, if the sensing elements 214 are or include strain gauges, the signals may be voltages that vary based on the change in resistance of the strain gauges as the beam structure 216 is deflected. Other types of signals may be produced based on the particular type of sensing element used.

The device may determine, using the sensing elements 214, whether an input applied to the input member 211 satisfies one or more conditions. For example, the device may determine whether the input satisfies a condition indicative of a certain force or a certain deflection of the beam structure 216 (e.g., a threshold deflection). As another example, the device may determine whether the input satisfies a condition indicative of the input member 211 being depressed a particular distance (of one or more potential distances). As another example, the device may determine whether the input satisfies a duration condition (e.g., the input has been detected at least for a particular duration). Conditions may be single factor conditions (e.g., a force or deflection condition) or multi-factor conditions (e.g., a force and duration condition, such as an input force being detected for a threshold duration). In response to detecting that the input satisfies the condition, the device may perform an operation (e.g., change an audio output volume, toggle between an audible and a silent mode, deactivate a screen, put the device in a "sleep" mode, or the like).

The device may also be configured to determine whether an actuation of the input member satisfies one of multiple possible conditions, and may perform different operations in response to detecting that the different conditions are satisfied. For example, the device may be configured to perform a first operation if a first condition is satisfied, and a second operation if a second condition is satisfied. The different conditions may correspond to different amounts of deflection of the beam structure 216 (which may correspond to different magnitudes of force applied to the input member 211 and/or different depression distances of the input member 211). Thus, for example, the device may perform a first operation if the input meets a first force threshold, and a second operation (different from the first operation) if the input meets a second force threshold that is greater than the first force threshold. As one nonlimiting example, upon detecting that a first condition is satisfied (e.g., a first force threshold) while the device is in an image capture mode, the device may focus a camera on an object. Upon detecting that a second condition is satisfied (e.g., a second force threshold, greater than the first force threshold), the device may capture an image. Other operations may also be performed upon determining that the different conditions are satisfied.

In cases where the input member 211 defines multiple differentiated actuation regions, each actuation region may be associated with different sets of multiple input conditions and associated operations. Thus, for example, the first actuation region 206 may be associated with a first condition and a second condition (and first and second operations that are initiated upon detection of the first and second conditions), while the second actuation region 208 may be associated with a third condition and a fourth condition (and third and fourth operations that are initiated upon detection of the third and fourth conditions). As one example application, the first actuation region 206 may be selectable to zoom a camera in a first direction at a first speed (first condition and first operation) and zoom the camera in the first direction at a second speed (second condition and second operation), while the second actuation region 208 may be selectable to zoom the camera in a second direction at a first speed (third condition and third operation) and zoom the camera in the second direction at a second speed (fourth condition and fourth operation). The device may be configured with other conditions and corresponding operations as well. Moreover, the particular conditions at which operations are initiated or triggered and the operations themselves may be dynamic, and may differ based on a state or mode of operation of the device (e.g., an application that is being executed, a user interface that is being displayed, etc.).

As noted above, the sensing elements 214 may be configured to produce a signal that varies continuously with the force applied to the input member 211. In some cases, the device may perform an operation in a manner that is scaled relative to the signal from a sensing element. For example, a rate of change of a parameter may be scaled relative to the amount of deflection indicated by the sensing element (e.g., a harder press results in greater deformation and thus a greater rate of change of the parameter). As one example, a rate of change of device volume may be scaled based on the deflection (e.g., corresponding to the force applied to the button 210). As another example, a rate of change of zoom level for a camera may be scaled based on the deflection. Deflection need not only be used to scale rates of change. For example, a value of a parameter may be scaled based on the force applied to the input button. As an example, during an operation to set a screen brightness, the brightness value may be scaled based on the deflection (e.g., a higher deflection results in a higher brightness setting).

As noted above, a device may determine whether a particular input satisfies a condition based at least in part on signals or information from sensing elements 214 (which may be strain sensing elements). Determining whether an input satisfies a condition may be performed in various ways, depending on factors such as the type of sensing element 214 (e.g., strain gauge, piezoresistive element, optical, etc.) and the type of condition being evaluated (e.g., force, deflection, distance, angle, etc.). In some cases, signals from the sensing elements 214 may be correlated or associated with certain values, such as force, distance, etc. As one example, a device may determine whether an input force satisfies a force value. In some cases, conditions are based on a value of a signal or other property of the sensing element. As one example, a device may determine whether a voltage measured across a strain gauge satisfies a voltage condition (which generally correlates to the amount of strain or deflection experienced by the strain gauge). Other techniques are also contemplated.

The button 210 may also include a haptic actuation system that produces haptic or tactile feedback when the user actuates the button 210 (e.g., when the user presses the button with sufficient force and/or a sufficient distance to cause the device to register an input). The haptic actuation system may include an electromagnetic element 218 that is coupled to the beam structure 216. The electromagnetic element 218 may be selectively magnetized to cause the electromagnetic element 218 to be attracted to a ferromagnetic structure 220 (which is set apart from the electromagnetic element 218 and the beam structure 216 more generally by a gap), thereby deflecting the beam structure 216 and moving the input member 211 that is coupled to the beam structure 216. For example, when the device detects an input to the input member 211 that satisfies a condition, the device may activate the electromagnetic element 218 to produce the movement of the input member 211. The device may then cease activating the electromagnetic element 218, thereby ceasing the attraction to the ferromagnetic structure 220. The electromagnetic element 218 may be configured to pull the input member 211 inward, as illustrated in FIG. 2C. In other examples, the electromagnetic element 218 may be configured to push the input member 211 outward. The electromagnetic element 218 may also cycle between pushing and pulling the input member 211 to produce oscillations or other haptic effects.

The movement of the input member 211 (e.g., the movement of the input member 211 away from the user's finger, and the subsequent release of the magnetic force) may be felt to a user as a "click," which may provide tactile feedback to the user that the input has been registered. FIG. 2C illustrates the button 210 when the electromagnetic element 218 is activated, resulting in deflection of the beam structure 216 and corresponding movement the input member 211 inward.

The haptic actuation of the input member 211 may be initiated when the input member 211 has been moved a certain distance (and/or in response to any input condition being satisfied), and may move the input member 211 a second distance. For example, as described above, an actuation condition may be satisfied when the device detects an inwards deflection of the beam structure 216 (e.g., FIG. 2B) that satisfies a certain condition (e.g., a strain condition, a distance condition, etc.). In response to detecting that the condition is satisfied, the electromagnetic element 218 (or another suitable actuation system) may cause the beam structure 216 to be deflected further inwards (e.g., FIG. 2C) and then released. In some cases, the actuation condition is satisfied when the inwards deflection of the input member 211 is between about 20 microns and about 25 microns, and the haptic actuation results in the input member 211 being deflected inwards an additional distance between about 50 microns and about 150 microns. In some cases, the gap between the beam structure 216 and the ferromagnetic structure 220 (or other structure below the beam structure 216) is between about 150 microns and about 200 microns. The button 210 may be configured such that the deflection caused by the haptic actuation (e.g., FIG. 2C) is less than the gap between the beam structure 216 and the underlying structure (e.g., the ferromagnetic structure 220), such that the beam structure 216 does not contact the underlying structure during the haptic actuation.

The electromagnetic element 218 may be an electromagnet (e.g., a conductive coil optionally surrounding a ferrous or magnetic core). In some cases, the electromagnetic element may be stationary (e.g., positioned off of the beam structure 216), and may cause the beam structure 216 to deflect by magnetically attracting the beam structure 216 (which may include a ferromagnetic material or element). In some cases, the haptic response of the button 210 may be produced by other actuation systems, including but not limited to solenoids, piezoelectric elements, and actuators (e.g., linear resonant actuators).

The haptic actuation system may be configured to produce haptic outputs in response to various conditions being satisfied. In some cases, haptic outputs are produced in response to the satisfaction of input conditions of the button 210. For example, as described above, a device may perform different operations in response to different input conditions being satisfied (e.g., different force and/or deflection thresholds being met). Haptic outputs may be produced in response to the satisfaction of the conditions to provide an indication to the user that the conditions have been satisfied (e.g., that the input has been recognized by the device). In circumstances where the device 200 is configured to respond to a single condition (e.g., a single force or deflection threshold), the haptic actuation system may produce a haptic output when the condition is satisfied (e.g., by moving the beam structure 216 as described with respect to FIG. 2C). In circumstances where the device 200 is configured to respond to multiple conditions (e.g., two different force or deflection thresholds), the haptic actuation system may produce a first haptic output when a first condition is satisfied (e.g., a first deflection or force threshold) and a second haptic output when a second condition is satisfied (e.g., a second deflection or force threshold different from the first). In some cases, whether the device is configured to respond to one or multiple conditions (and thus produce one or multiple haptic outputs) may depend on a state or mode of operation of the device (e.g., an application that is being executed, a user interface that is being displayed, etc.).

Haptic outputs may also have different durations. The particular duration of a haptic output may depend on various factors, including but not limited to a state or mode of operation of the device (e.g., an application that is being executed, a user interface that is being displayed, etc.), a type of input condition that is satisfied and/or triggers the haptic output, an amount of force applied to the button, a duration of an input, and the like. For example, when a device is in a state in which an input to the button is configured to change a ringer volume (e.g., increase or decrease ringer volume), the haptic output in response to an input (e.g., an input satisfying a particular condition) may have a longer duration than when the input button is configured to capture an image (e.g., a shutter button mode).

FIGS. 2A-2C illustrate a button in which the beam structure 216 is coupled, at its ends, to the housing 213. However, other configurations are also contemplated. For example, in some cases, the beam structure 216 may be coupled to the housing 213 or otherwise constrained at a location between the posts 212, such that the ends of the beam structure 216 are cantilevered and/or otherwise unconstrained. In such cases, the ends of the beam structure 216 may be deflected (e.g., downwards) in response to force inputs applied to the input member 211. Moreover, one or more haptic actuation systems may cause the ends of the beam structure to be deflected, which may cause the input member 211 to move to produce a haptic output. The haptic actuation system(s) may be configured to selectively deflect one or the other end of the beam structure, or may be configured to deflect both ends substantially simultaneously and equally.

Figure 3A:
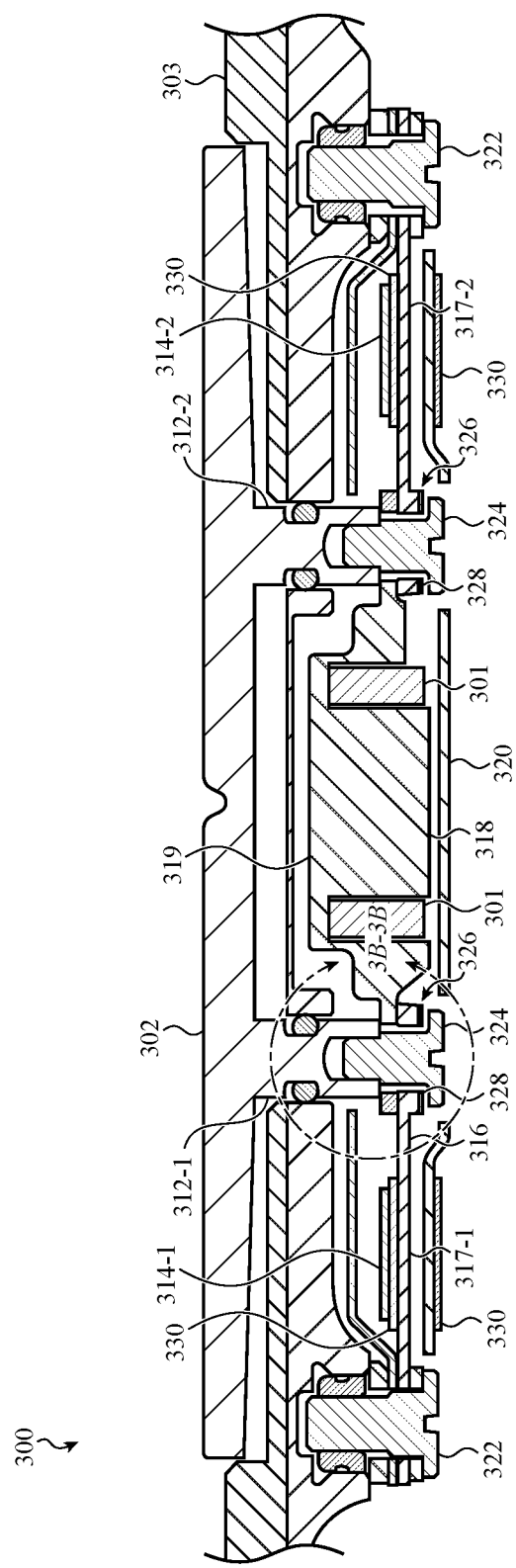
FIG. 3A depicts a partial cross-sectional view of another example input button assembly.

FIG. 3A is a partial cross-sectional view of an example button 300 that uses a sensing system (e.g., a strain sensing system) and a haptic actuation system. The button 300 may generally correspond to the button 116 in FIGS. 1A-1C, or any other button described herein.

The button 300 includes an input member 302 that includes or defines include posts 312-1, 312-2 that extend through holes formed in a housing 303. The input member 302 may be a unitary structure that defines a first actuation region and a second actuation region (e.g., the first and second actuation regions 206, 208 in FIGS. 2A-2C), which may be visually and/or tactilely distinct from one another (e.g., by a channel, ridge, groove, marking, bump, etc.).

The posts 312 are coupled to a beam structure 316 within the device. The beam structure 316 may include a first compliant segment 317-1 with a first sensing element 314-1 and a second compliant segment 317-2 with a second sensing element 314-2. The first and second compliant segments may be separate components that are coupled to an actuation segment 319, and are positioned on opposite sides of the actuation segment 319. The compliant segments may be positioned proximate opposite ends of the beam structure 316. The actuation segment 319 may be positioned between the compliant segments (e.g., at or near a middle of the beam structure 316).

The first and second compliant segments 317 and the actuation segment 319 may define the beam structure 316, and may be rigidly coupled to one another (e.g., via welds, fasteners, etc.). As described above, the sensing elements 314 may be or may include strain gauges, or other components or materials that detect deflection of the beam structure 316 (and more particularly, the compliant segments 317).

The actuation segment 319 may include an electromagnetic element 318. The electromagnetic element 318 may include a conductive coil 301, which may surround a core, which may be formed from a ferromagnetic material, ferrimagnetic material, or other suitable material (e.g., iron, ferrite, steel, ferrous materials, permanent magnet, etc.). As described above, when tactile feedback (e.g., haptic output) is to be produced at the input member 302, the conductive coil 301 may be energized, which causes the electromagnetic element 318 to be attracted to a ferromagnetic structure 320.

The input member 302 may be coupled to the beam structure 316 via fasteners 324 (e.g., screws). The fasteners 324 may secure the input member to the beam structure 316 such that input forces applied to the input member 302 are transferred to the beam structure 316. The input forces that are transferred to the beam structure 316 result in the compliant segments 317 deforming in response to the input force. Further, the fasteners 324 secure the input member 302 to the beam structure 316 such that deformations of the beam structure 316 produced by the actuation segment 319 (e.g., pulling the beam structure 316 towards the interior of the device or otherwise imparting a force to the beam structure 316) result in translation of the input member 302 to produce a haptic output. The beam structure 316 (and optionally the ferromagnetic structure 320 and other structures and components of the button 300) may be coupled to the device housing 303 via fasteners 322.

Figure 3B:
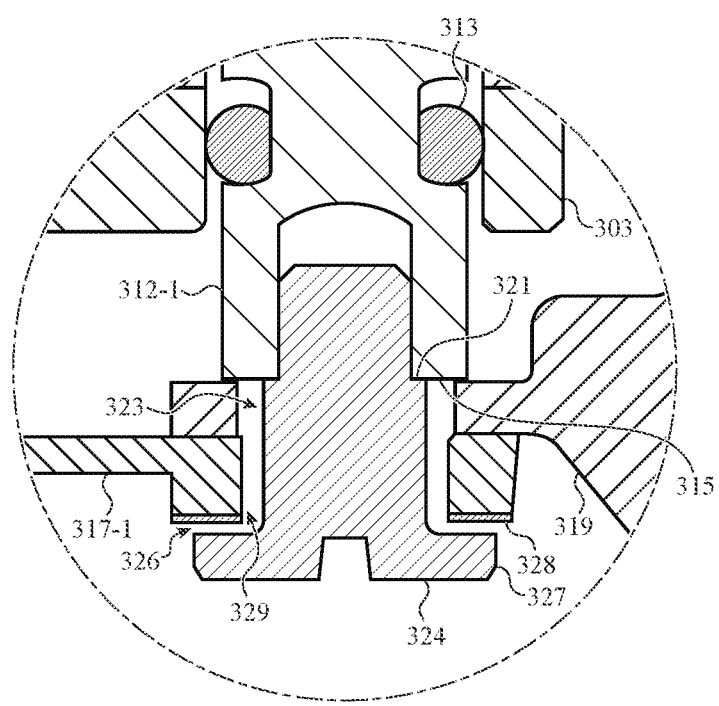
FIG. 3B depicts a detail view of the input button assembly of FIG. 3A.

FIG. 3B is a detail view of area 3B-3B in FIG. 3A, the button 300, illustrating an example coupling between the input member 302 and the beam structure 316. As shown, a fastener 324 (e.g., a threaded fastener) extends through a hole 323 that is formed through the beam structure 316, and into a hole defined in the post 312-1. As shown, the hole 323 may be defined by a first hole extending through the compliant segment 317-1 and a second hole extending through the actuation segment 319.

In some cases, the fastener 324 may be configured to retain the input member 302 to the beam structure 316 without rigidly coupling the input member 302 to the beam structure 316. By allowing some degree of movement between these components, the likelihood of the input member 302 binding, racking, or otherwise interfering with other structures may be reduced while also allowing the input member 302 to impart a force onto the beam structure 316 (e.g., as a result of an input to the input member 302) and allowing the beam structure to impart a force on the input member 302 (e.g., to produce haptic outputs). This may be achieved by a gap 326 between a head 327 of the fastener 324 and the beam structure 316, as well as a gap 329 between a shaft of the fastener 324 and the hole surface of the beam structure 316. The gaps may allow the input member 302 to move relative to the beam structure 316 during inputs and haptic outputs, which ultimately allows the input member 302 to self-locate to a non-binding and/or non-interfering position. The gaps may allow movement of the input member 302 in multiple directions relative to the beam structure 316 (e.g., vertically and horizontally, as oriented in FIG. 3B).

The size of the gaps may be selected so the movement of the input member 302 during inputs and haptic outputs is greater than the gaps. For example, the gap 326 may be between about 10 and about 50 microns, while an input may move the input member 302 between about 100 and about 200 microns, and a haptic actuation system may be configured to move the beam structure 316 between about 100 and about 200 microns. Thus, the movements of the components produced by inputs and outputs will close any gaps while also allowing sufficient engagement between the components to transfer forces between the components (e.g., so the input member 302 can deflect the beam structure 316 in response to an input and the beam structure 316 can move the input member 302 to produce a haptic output).

In examples where the input member 302 is not rigidly coupled to the beam structure 316, the sealing member 313 (e.g., an O-ring) may provide a centering force to position the input member 302 in a target position relative to the housing 303.

In some cases, a bushing 328 may be provided between the head 327 of the fastener 324 and the beam structure 316. The bushing 328 may be configured to provide a more compliant interface between the fastener 324 and the beam structure 316 during inputs and haptic outputs. For example, in order to produce a haptic output, the actuation segment 319 of the beam structure 316 may be energized such that the beam structure 316 is pulled downward (relative to the orientation in FIG. 3B). This downward movement causes the beam structure 316 to close the gap 326 and begin pulling the input member 302 downward. The bushing 328 may reduce friction between the beam structure and the fastener 324 during this engagement, and may also reduce audible noise that might otherwise occur due to the contact between these components. The bushing 328 may be formed of or include a polymer material (e.g., nylon, polyethylene terephthalate (PET)), or any other suitable material. The bushing 328 may be adhered to or otherwise attached to the beam structure 316 or the fastener 324, or it may be free-floating between the components.

The fastener 324 and the input member 302 may define a fixed-length region between the head 327 of the fastener and the end 315 of the post 312. For example, the fastener 324 may define a shoulder 321 that contacts the end 315 of the post 312 to define a maximum insertion distance of the fastener 324. When secured to the maximum insertion distance, the gap 326 having the target size may be defined between the components.

Figure 3C:
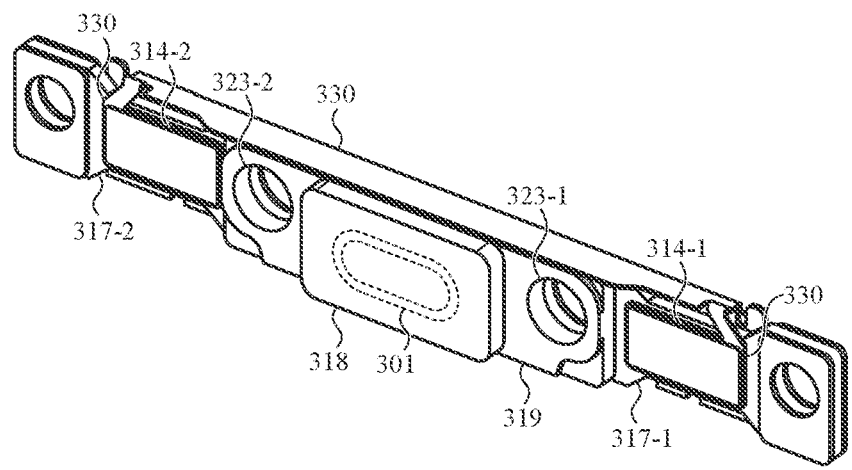
FIGS. 3C-3D depict components of the input button assembly of FIG. 3A.
Figure 3D:
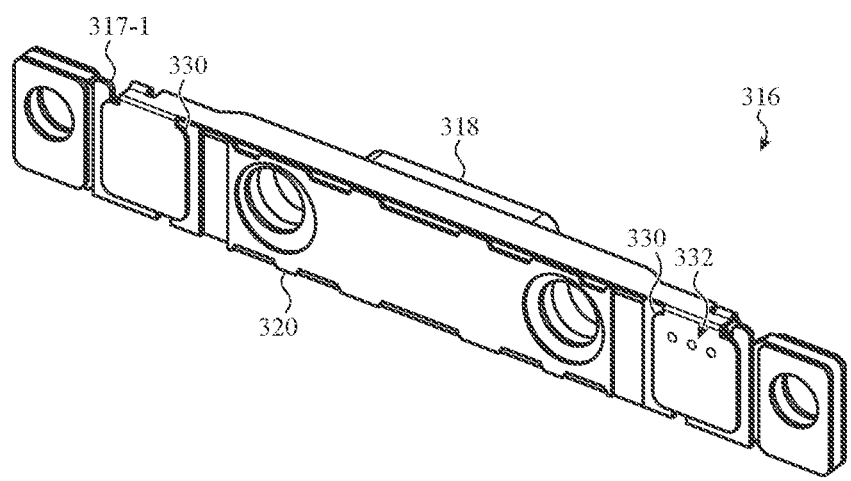

FIGS. 3C and 3D are perspective views of a portion of the button 300, including the beam structure 316, the ferromagnetic structure 320, and a flexible circuit element 330 that conductively couples sensing elements to other components (e.g., a processing system, another circuit element, etc.). As shown in FIG. 3C, sensing elements 314 may be coupled to a flexible circuit element 330, and the sensing elements 314 and/or the flexible circuit element 330 may be coupled to the compliant segments 317. The flexible circuit element 330 may wrap around the beam structure 316 and the ferromagnetic structure 320, and may include or define a connector 332 along the side of the button components. The connector 332 may conductively couple the flexible circuit element 330 (and thus the sensing elements 314) to other circuitry within the device. The flexible circuit element 330 may also be conductively coupled to the conductive coil 301 in the actuation segment 319. The flexible circuit element 330 may carry signals for the conductive coil 301 and the sensing elements 314, including signals from the sensing elements 314 reflective of input forces, and signals to the conductive coil 301 to energize the coil to produce haptic outputs.

Figure 4:
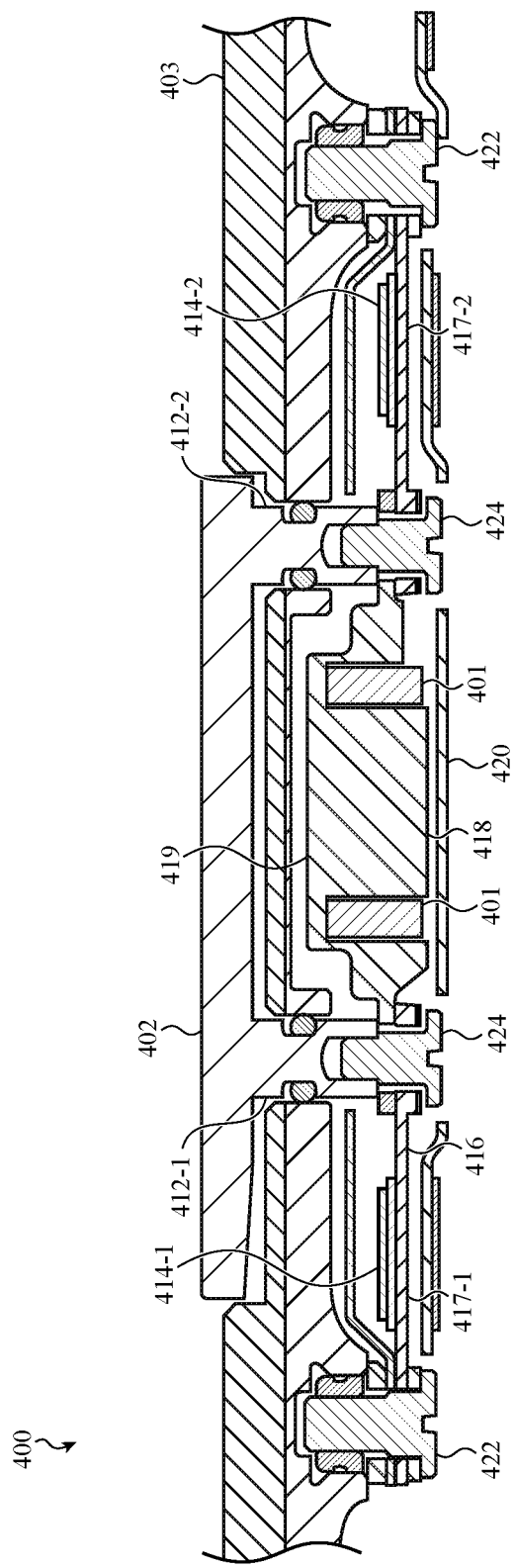
FIG. 4 depicts a partial cross-sectional view of another example input button assembly.

FIGS. 3A-3D illustrate an example button 300 that includes two visually (and tactilely) distinct input regions on the input member, and that can distinguish between inputs applied to the different input regions. In some cases, a button that includes a single input region may use the same or similar design as the button 300. FIG. 4 illustrates an example button 400 that includes an input member 402 that does not include multiple visually and/or tactilely distinct input regions. The button 400 may be used where the button is configured to respond in a certain way regardless of where, on the input member 402, an input is applied, or where visual and/or tactile differentiation is not desired. As described herein, while the button 400 does not include multiple visually and/or tactilely distinct input regions, the button 400 may use the same or similar structures as the buttons 210, 300, and may therefore distinguish between inputs applied to different location on the input member 402 (e.g., determine the location of an input), and may cause a device to perform different actions based on the location of the input.

FIG. 4 is a partial cross-sectional view of an example button 400 that uses a sensing system (e.g., a strain sensing system) and a haptic actuation system. The button 400 may generally correspond to the button 120 in FIGS. 1A-1C, or any other button described herein. While the button 116 may include multiple actuation regions, the button 120 may include a single actuation region. The button 120 may control a power or "wake" state of a device.

The button 400 includes an input member 402 that includes or defines include posts 412-1, 412-2 that extend through holes formed in a housing 403. The input member 402 may define a single input region or input surface, and as described above, the button 400 may be configured to respond in the same way to inputs that satisfy a condition, regardless of the location of the input on the input member 402. In some cases, however, the button 400 may determine a location of an input and may perform different operations based on the location. Further, in some cases, gesture inputs applied to the input member 402 may be detected.

The posts 412 are coupled to a beam structure 416 within the device. The beam structure 316 may include a first compliant segment 417-1 with a first sensing element 414-1 and a second compliant segment 417-2 with a second sensing element 414-2. The first and second compliant segments may be separate components that are coupled to an actuation segment 419. The first and second compliant segments 417 and the actuation segment 419 may define the beam structure 416, and may be rigidly coupled to one another (e.g., via welds, fasteners, etc.). As described above, the sensing elements 414 may be or may include strain gauges, or other components or materials that detect deflection of the beam structure 416 (and more particularly, the compliant segments 417).

The actuation segment 419 may include an electromagnetic element 418. The electromagnetic element 418 may include a conductive coil 401, which may surround a core, which may be formed from a ferromagnetic material, ferrimagnetic material, or other suitable material (e.g., iron, ferrite, steel, ferrous materials, permanent magnet, etc.). As described above, when tactile feedback (e.g., haptic output) is to be produced at the input member 402, the conductive coil 401 may be energized, which causes the electromagnetic element 418 to be attracted to a ferromagnetic structure 420.

The input member 402 may be coupled to the beam structure 416 via fasteners 424 (e.g., screws). The fasteners 424 may secure the input member to the beam structure 416 such that input forces applied to the input member 402 are transferred to the beam structure 416. The input forces that are transferred to the beam structure 416 result in the compliant segments 417 deforming in response to the input force. Further, the fasteners 424 secure the input member 402 to the beam structure 416 such that deformations of the beam structure 416 produced by the actuation segment 419 (e.g., pulling the beam structure 416 towards the interior of the device or otherwise imparting a force to the beam structure 416) result in translation of the input member 402 to produce a haptic output. The beam structure 416 (and optionally the ferromagnetic structure 420 and other structures and components of the button 400) may be coupled to the device housing 403 via fasteners 422.

The operation of the button 400 may be generally the same as described with respect to the buttons 210 and 300, and the description of those buttons will be understood to apply equally to the button 400. Moreover, the buttons 210, 300 may be configured with an asymmetrical input member, similar to the input member 402. As noted above, while the button 400 may be configured to detect or determine a location of an input on the input member 402, the button 400 (or a device that incorporates the button 400) may not use the location as a condition or to otherwise determine how to respond. In some cases, the button 400 (or a device that incorporates the button 400) may be configured to detect gesture inputs. In such cases, if a movement of the input along the input member 402 is detected (e.g., from a user swiping while applying some force to the input member 402), the device may perform one operation (e.g., change a device parameter in accordance with a property of the movement), and if no movement is detected, the device may perform a different operation (e.g., toggle a sleep/awake mode of the device).

FIGS. 5A-5G illustrate an example device with switch 508 and button 510, showing various ways in which inputs to the input systems may control operations of the device. The switch 508 may correspond to or be an embodiment of the switch 118, while the button 510 may correspond to or be an embodiment of the button 116. Both input systems may have the same or similar structures and functions of the corresponding input systems described herein.

Figure 5A:
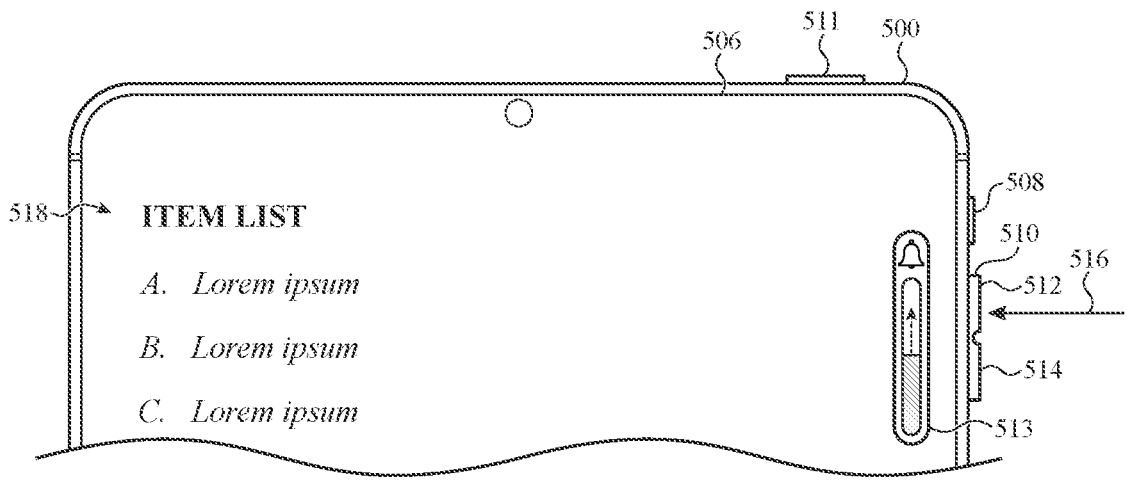
FIGS. 5A-5G depict operations of an electronic device with input button assemblies as described herein.

FIG. 5A illustrates the device 500 while a first graphical output 518 is displayed on a display 506. In this example, the graphical output 518 includes a list of objects, but this is merely one example of graphical outputs that may be displayed while inputs are received at the input systems 508, 510. FIG. 5A illustrates an example mode of operation in which the switch 508 is configured to change a ringer mode of the device, such as between a ring mode and a silent mode. In some cases, the device in FIG. 5A is in a ring mode (e.g., the ringer is configured to produce audio output in response to an incoming call or other notification), which may correspond to the switch 508 being positioned in a first position. FIG. 5A further illustrates an example mode of operation in which pressing the button 510 changes a ringer volume of the device. For example, in response to an input 516 applied to the first input region 512 that satisfies a condition (e.g., a threshold force or deflection), the device 500 increases a ringer volume, as indicated by the ringer volume indicator 513 (which may increase as shown by the dotted arrow). The speed at which the volume changes may vary based on the force of the input 516, as described above. (More generally, the force of an input, as detected by the button 510, may be used to scale some parameter of a device operation, such as a speed of volume change, a speed of scroll, a speed of optical zoom, a screen brightness level, etc.) In this mode, an input applied to the second input region 514 may cause the ringer volume to decrease.

Figure 5B:
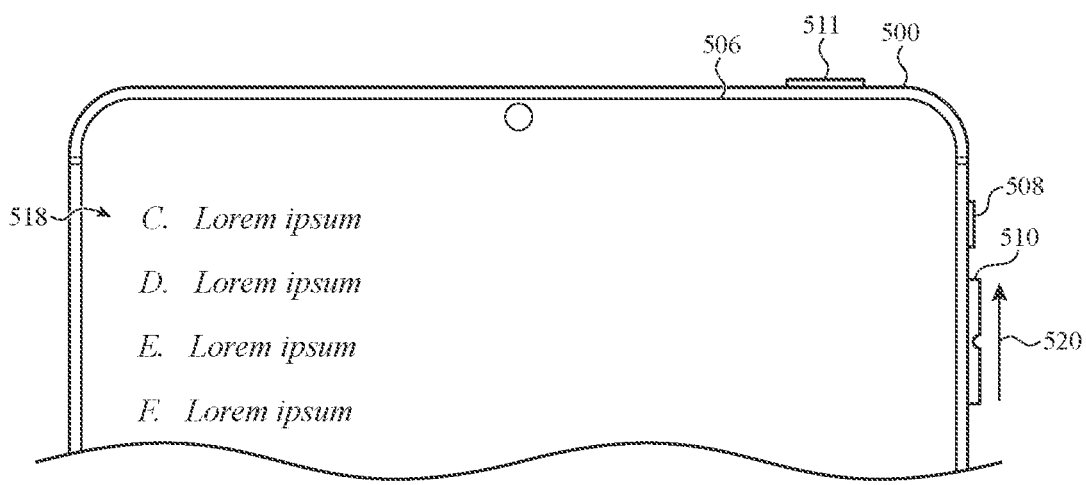

As noted above, buttons as described herein may be configured to detect gesture inputs. The device may be configured to differentiate gesture inputs from press or force inputs and can perform different operations when the different inputs are detected. FIG. 5B illustrates a gesture input 520, such as an upward swipe along the surface of the button 510, and which may extend across both the first and second input regions 512, 514. In response to detecting the gesture input 520 (e.g., based on the deflections caused on a beam structure by the force of the gesture input 520), the device may perform a different operation than the input 516 in FIG. 5A. In this example, the operation includes scrolling the list of displayed items. While FIG. 5B illustrates the scrolling operation in response to a gesture input, scrolling operations may also be initiated in response to a button press (such as the input 516). For example, a press on the input region 512 may result in a scroll in a first direction, and a press on the input region 514 may result in a scroll in a second direction opposite the first (optionally with the magnitude of the force of the inputs controlling the speed of the scroll operations).

FIGS. 5C-5F illustrate how the function of one button may depend on a mode of operation of the device, where the mode of operation of the device is selected by a different input system. For example, the switch 508 may be used to change a mode of operation of the device, and the function of the button 510 may be different in each mode.

Figure 5C:
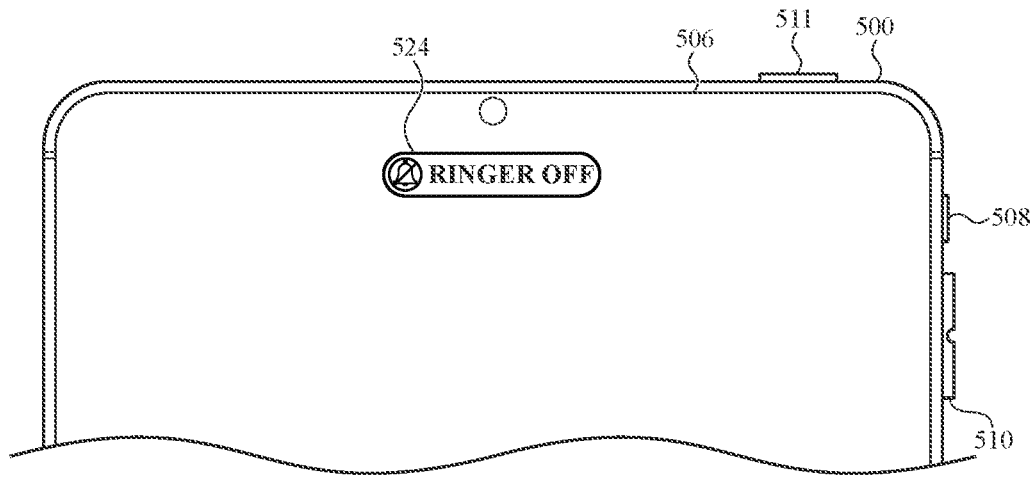

FIG. 5C illustrates the device 500 while the device 500 is in a first mode of operation (e.g., a ringer mode in which audible outputs are produced in response to calls or other alerts) and an input is received at the switch 508. In particular, moving the switch 508 to a different position (or otherwise actuating the switch 508 or other input system) while the device is in the first mode, the device 500 transitions from the first mode (e.g., the ring mode) to a second mode (e.g., a silent mode in which an audio output is not produced in response to an incoming call or other alert). The device 500 may produce a graphical indication 524 indicating the change in the mode of the device 500 from the ring mode to the silent mode.

Figure 5D:
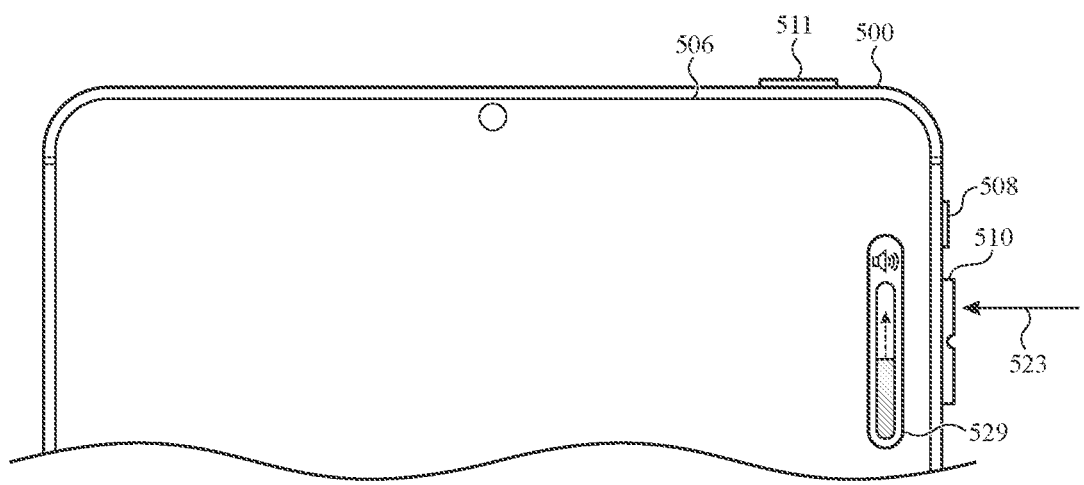

FIG. 5D illustrates the device 500 while the device is in the second mode of operation (e.g., the silent mode) and an input 523 is received at the button 510. In accordance with a determination that the input 523 satisfies a condition (e.g., a force or deflection condition), the device 500 may perform an operation, such as changing the audio output volume of the device (e.g., increasing or decreasing audio output volume), without changing or affecting the ringer mode. Thus, for example, an audio playback volume may be changed, but the ringer may remain off. While the audio output volume is being changed, the device 500 may display an audio output volume indicator 529 (which may increase as shown by the dotted arrow).

Figure 5E:
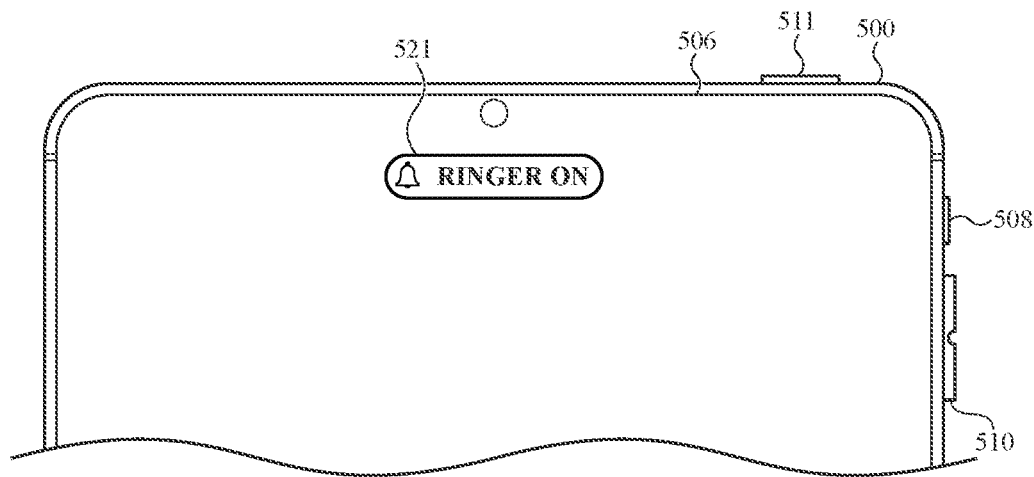

FIG. 5E illustrates the device 500 while the device 500 is in the second mode of operation (e.g., a silent mode) and an input is received at the switch 508. In particular, moving the switch 508 to a different position (or otherwise actuating the switch 508 or other input system) while the device is in the second mode, the device 500 transitions from the second mode (e.g., the silent mode) to the first mode (e.g., a ring mode). The device 500 may produce a graphical indication 521 indicating the change in the mode of the device 500 from the silent mode to the ring mode.

Figure 5F:
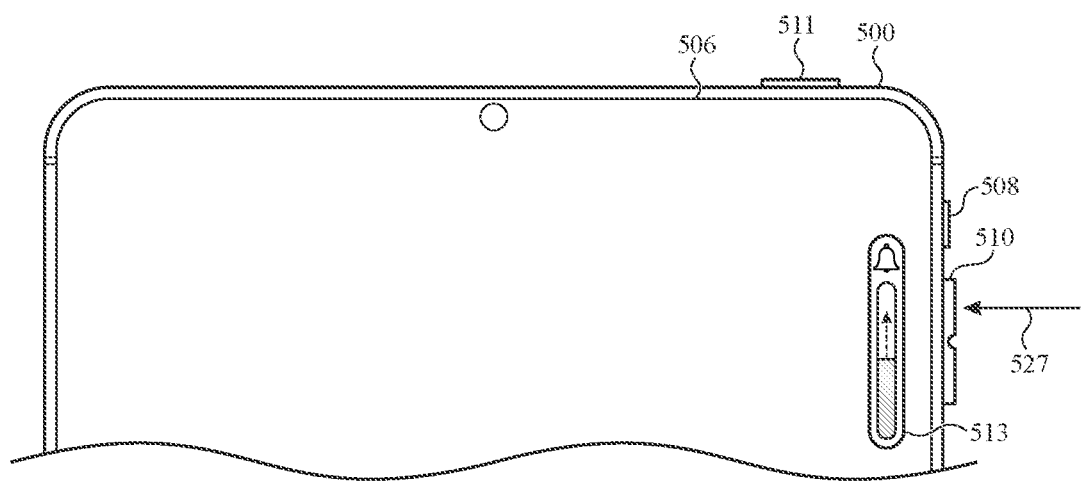

FIG. 5F illustrates the device 500 while the device is in the first mode of operation (e.g., the ring mode, having been transitioned to the first mode by the input to the switch 508) and an input 527 is received at the button 510. In accordance with a determination that the input 527 satisfies a condition (e.g., a force or deflection condition), the device 500 may perform an operation, such as increasing the ringer output volume of the device (as indicated by the ringer volume indicator 513). Thus, the function of the button 510 depends on a mode of operation that is selected by the switch 508. While the foregoing example describes the functions of the input systems as changing a ringer mode and changing an audio output or ringer volume, the same principles may apply to other modes as well. For example, the inputs to the switch 508 may affect other modes and inputs to the button 510 may change other device functions or parameters. For example, an input to the switch 508 may cause the device to transition to a haptic-alert mode in which the phone produces haptic outputs in response to incoming calls or notifications, and in that mode, the button 510 may cycle through different haptic output patterns. As another example, inputs to the switch 508 may cause the device to transition between different applications, and the button 510 may have different application-specific functions depending on the application selected by the switch 508.

Figure 5G:
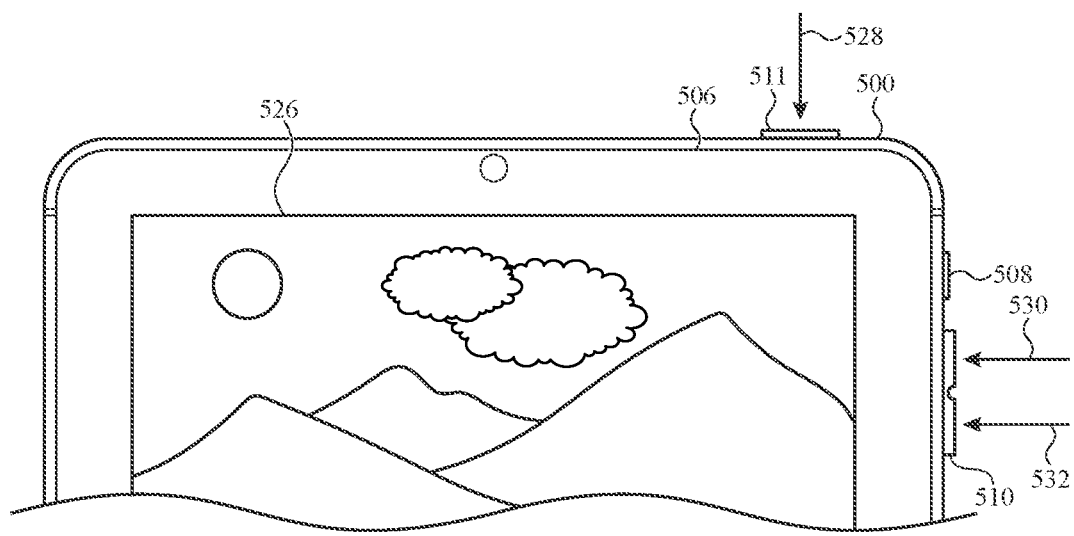

FIG. 5G illustrates the device 500 in a mode whereby both the button 511 (which may be an embodiment of or otherwise correspond to the button 120 in FIG. 1A) and the button 510 have application-specific functions, such as an image capture mode. In this mode, the device 500 may be configured to capture an image (e.g., video or still), and the display 506 may show a live preview 526 of the scene being captured by a camera of the device. In this mode, the button 511 may be configured as a shutter button, while the button 510 may be configured as a zoom control button. Accordingly, an input 530 to a first actuation region of the button 510 may cause the camera to zoom in, and an input 532 to a second actuation region may cause the camera to zoom out (and the force of the inputs may affect a speed of the zoom operation). An input 528 to the button 511 may cause the camera to capture the image. This is merely one example of button functions for the buttons 511, 510, and other functions are also contemplated and may differ based on the mode or state of the device.

Figure 6:
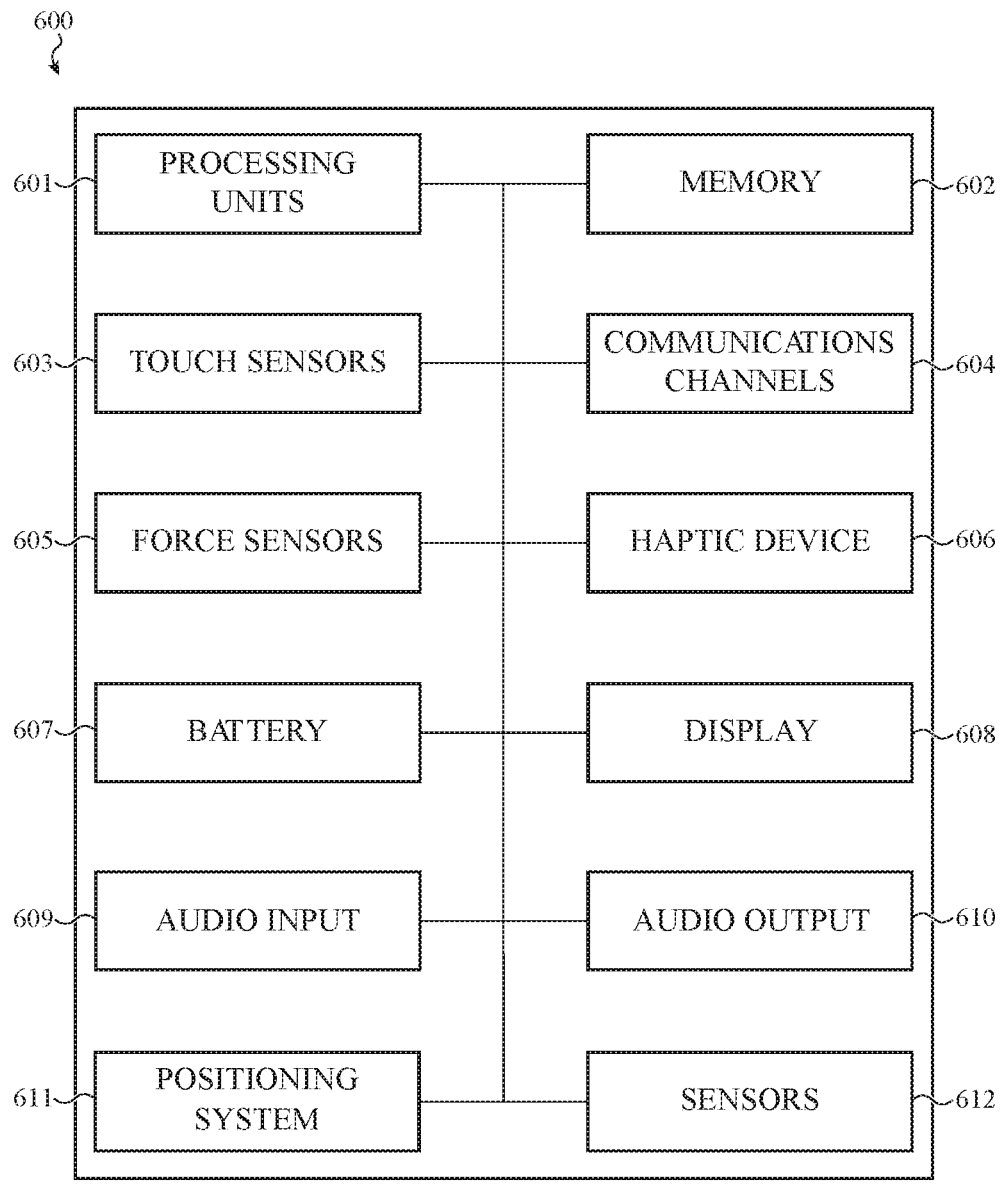
FIG. 6 depicts a schematic diagram of an example electronic device.

FIG. 6 depicts an example schematic diagram of an electronic device 600. The electronic device 600 may be an embodiment of or otherwise represent the device 100 (or other devices described herein, such as the devices 100, 200, and 500). The device 600 includes one or more processing units 601 that are configured to access a memory 602 having instructions stored thereon. The instructions or computer programs may be configured to perform one or more of the operations or functions described with respect to the electronic devices described herein. For example, the instructions may be configured to control or coordinate the operation of one or more displays 608, one or more touch sensors 603, one or more force sensors 605, one or more communication channels 604, one or more audio input systems 609, one or more audio output systems 610, one or more positioning systems 611, one or more sensors 612, and/or one or more haptic feedback devices 606.

The processing units 601 of FIG. 6 may be implemented as any electronic device capable of processing, receiving, or transmitting data or instructions. For example, the processing units 601 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 601 may be coupled to a circuit board assembly.

The memory 602 can store electronic data that can be used by the device 600. For example, a memory can store electrical data or content such as, for example, audio and video files, images, documents and applications, device settings and user preferences, programs, instructions, timing and control signals or data for the various modules, data structures or databases, and so on. The memory 602 can be configured as any type of memory. By way of example only, the memory can be implemented as random access memory, read-only memory, Flash memory, removable memory, or other types of storage elements, or combinations of such devices.

The touch sensors 603 may detect various types of touch-based inputs and generate signals or data that are able to be accessed using processor instructions. The touch sensors 603 may use any suitable components and may rely on any suitable phenomena to detect physical inputs. For example, the touch sensors 603 may be capacitive touch sensors, resistive touch sensors, acoustic wave sensors, or the like. The touch sensors 603 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 603 may be integrated with or otherwise configured to detect touch inputs applied to any portion of the device 600. For example, the touch sensors 603 may be configured to detect touch inputs applied to any portion of the device 600 that includes a display (and may be integrated with a display). The touch sensors 603 may operate in conjunction with the force sensors 605 to generate signals or data in response to touch inputs. A touch sensor or force sensor that is positioned over a display surface or otherwise integrated with a display may be referred to herein as a touch-sensitive display, force-sensitive display, or touchscreen.

The force sensors 605 may detect various types of force-based inputs and generate signals or data that are able to be accessed using processor instructions. The force sensors 605 may use any suitable components and may rely on any suitable phenomena to detect physical inputs. For example, the force sensors 605 may be strain-based sensors, piezoelectric-based sensors, piezoresistive-based sensors, capacitive sensors, resistive sensors, or the like. The force sensors 605 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 605 may be used in conjunction with various input mechanisms to detect various types of inputs. For example, the force sensors 605 may be used to detect presses or other force inputs that satisfy a force threshold (which may represent a more forceful input than is typical for a standard "touch" input). Like the touch sensors 603, the force sensors 605 may be integrated with or otherwise configured to detect force inputs applied to any portion of the device 600. For example, the force sensors 605 may be configured to detect force inputs applied to any portion of the device 600 that includes a display (and may be integrated with a display). The force sensors 605 may operate in conjunction with the touch sensors 603 to generate signals or data in response to touch- and/or force-based inputs. Force sensors may also be integrated into button assemblies to detect force inputs applied to input members, as described herein. For example, buttons 116, 120, 300, 400, 510, 511 may include or utilize force sensors 605 (e.g., strain-based force sensors).

The device 600 may also include one or more haptic devices 606 (e.g., the haptic actuation systems of the buttons described herein). The haptic device 606 may include one or more of a variety of haptic technologies such as, but not necessarily limited to, rotational haptic devices, linear actuators, piezoelectric devices, vibration elements, and so on. In general, the haptic device 606 may be configured to provide punctuated and distinct feedback to a user of the device. More particularly, the haptic device 606 may be adapted to produce a knock or tap sensation and/or a vibration sensation. Such haptic outputs may be provided in response to detection of touch and/or force inputs, and may be imparted to a user through the exterior surface of the device 600 and/or input members of buttons, as described herein. For example, buttons 116, 120, 300, 400, 510, 511 may include or utilize haptic devices 606, and haptic outputs may be imparted to a user through the input members of the buttons.

The one or more communication channels 604 may include one or more wireless interface(s) that are adapted to provide communication between the processing unit(s) 601 and an external device. The one or more communication channels 604 may include antennas (e.g., antennas that include or use housing components as radiating members), communications circuitry, firmware, software, or any other components or systems that facilitate wireless communications with other devices. In general, the one or more communication channels 604 may be configured to transmit and receive data and/or signals that may be interpreted by instructions executed on the processing units 601. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces (e.g., for communicating using Wi-Fi communication standards and/or protocols, including IEEE 802.11, 802.11b, 802.11a, 802.11g, 802.11n, 802.11ac, 802.11ax (Wi-Fi 6, 6E), 802.11be (Wi-Fi 7), or any other suitable Wi-Fi standards and/or protocols), TCP/IP interfaces, network communications interfaces, or any conventional communication interfaces. The one or more communications channels 604 may also include ultra-wideband (UWB) interfaces, which may include any appropriate communications circuitry, instructions, and number and position of suitable UWB antennas.

As shown in FIG. 6, the device 600 may include a battery 607 that is used to store and provide power to the other components of the device 600. The battery 607 may be a rechargeable power supply that is configured to provide power to the device 600. The battery 607 may be coupled to charging systems (e.g., wired and/or wireless charging systems) and/or other circuitry to control the electrical power provided to the battery 607 and to control the electrical power provided from the battery 607 to the device 600.

The device 600 may also include one or more displays 608 configured to display graphical outputs. The displays 608 may use any suitable display technology, including liquid crystal displays (LCD), organic light-emitting diodes (OLED), active-matrix organic light-emitting-diode displays (AMOLED), or the like. The displays may use a low temperature polycrystalline silicone (LTPS) or low temperature polycrystalline oxide (LTPO) backplane. The displays 608 may display graphical user interfaces, images, icons, or any other suitable graphical outputs. The display 608 may correspond to a display 103, 506, or other displays described herein.

The device 600 may also provide audio input functionality via one or more audio input systems 609. The audio input systems 609 may include microphones, transducers, or other devices that capture sound for voice calls, video calls, audio recordings, video recordings, voice commands, and the like.

The device 600 may also provide audio output functionality via one or more audio output systems (e.g., speakers) 610. The audio output systems 610 may produce sound from voice calls, video calls, streaming or local audio content, streaming or local video content, or the like. The audio output systems 610 may also produce audible alerts, ringtones, or the like.

The device 600 may also include a positioning system 611. The positioning system 611 may be configured to determine the location of the device 600. For example, the positioning system 611 may include magnetometers, gyroscopes, accelerometers, optical sensors, cameras, global positioning system (GPS) receivers, inertial positioning systems, or the like. The positioning system 611 may be used to determine spatial parameters of the device 600, such as the location of the device 600 (e.g., geographical coordinates of the device), measurements or estimates of physical movement of the device 600, an orientation of the device 600, or the like.

The device 600 may also include one or more additional sensors 612 (also referred to as sensing systems) to receive inputs (e.g., from a user or another computer, device, system, network, etc.) or to detect any suitable property or parameter of the device, the environment surrounding the device, people, or things interacting with the device (or nearby the device), or the like. For example, a device may include temperature sensors, biometric sensors (e.g., fingerprint sensors, facial recognition systems, photoplethysmographs, blood-oxygen sensors, blood sugar sensors, or the like), eye-tracking sensors, proximity sensors, depth sensors (e.g., time-of-flight based depth or distance sensors), ambient light sensors, retinal scanners, humidity sensors, buttons, switches, lid-closure sensors, or the like.

To the extent that multiple functionalities, operations, and structures described with reference to FIG. 6 are disclosed as being part of, incorporated into, or performed by the device 600, it should be understood that various embodiments may omit any or all such described functionalities, operations, and structures. Thus, different embodiments of the device 600 may have some, none, or all of the various capabilities, apparatuses, physical features, modes, and operating parameters discussed herein. Further, the systems included in the device 600 are not exclusive, and the device 600 may include alternative or additional systems, components, modules, programs, instructions, or the like, that may be necessary or useful to perform the functions described herein.

As described above, one aspect of the present technology is the gathering and use of data available from various sources to improve the usefulness and functionality of devices such as tablet computers and mobile phones. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to locate devices, deliver targeted content that is of greater interest to the user, or the like. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the figure being referred to, unless an absolute horizontal or vertical orientation is indicated.

Features, structures, configurations, components, techniques, etc. shown or described with respect to any given figure (or otherwise described in the application) may be used with features, structures, configurations, components, techniques, etc. described with respect to other figures. For example, any given figure of the instant application should not be understood to be limited to only those features, structures, configurations, components, techniques, etc. shown in that particular figure. Similarly, features, structures, configurations, components, techniques, etc. shown only in different figures may be used or implemented together. Further, features, structures, configurations, components, techniques, etc. that are shown or described together may be implemented separately and/or combined with other features, structures, configurations, components, techniques, etc. from other figures or portions of the instant specification. Further, for ease of illustration and explanation, figures of the instant application may depict certain components and/or sub-assemblies in isolation from other components and/or sub-assemblies of an electronic device, though it will be understood that components and sub-assemblies that are illustrated in isolation may in some cases be considered different portions of a single electronic device (e.g., a single embodiment that includes multiple of the illustrated components and/or sub-assemblies).

What is claimed is:

1. An electronic device comprising:
an enclosure comprising:
a front cover defining a front exterior surface of the electronic device; and
a housing component coupled to the front cover and defining a side exterior surface of the electronic device;
an input button assembly comprising:
an input member positioned along the side exterior surface of the housing component and defining a first input region proximate a first end of the input member and a second input region proximate a second end of the input member, the input member configured to receive a user input;
a beam structure at least partially within the enclosure and coupled to the input member, the beam structure configured to be deflected as a result of the user input and comprising:
an actuation segment;
a first compliant segment on a first side of the actuation segment; and
a second compliant segment on a second side of the actuation segment;
a first strain sensing element at the first compliant segment of the beam structure; and
a second strain sensing element at the second compliant segment of the beam structure;
a first fastener rigidly coupling a first end of the beam structure to the housing component;
a second fastener rigidly coupling a second end of the beam structure to the housing component; and
a processing system within the enclosure and configured to determine whether the user input was applied to the first input region or the second input region based at least in part on at least one of a first signal from the first strain sensing element or a second signal from the second strain sensing element.

2. The electronic device of claim 1, wherein:
the user input causes the input member to move inwards a first distance; and
the processing system is further configured to determine whether an output of a sensing system including the first strain sensing element and the second strain sensing element satisfies a condition; and
the electronic device further comprises a haptic actuation system integrated with the input button assembly and configured to, in accordance with a determination that the output of the sensing system satisfies the condition, cause the input member to move inwards a second distance greater than the first distance.

3. The electronic device of claim 2, wherein:
the electronic device further includes a ferromagnetic structure set apart from the beam structure by a gap;
the haptic actuation system comprises a conductive coil coupled to the beam structure; and
the haptic actuation system energizes the conductive coil to cause the beam structure to be deflected towards a ferromagnetic structure, thereby causing the input member to move inwards the second distance.

4. The electronic device of claim 1, wherein the processing system is configured to:
in accordance with a determination that the user input was applied to the first input region, increase an audio output volume of the electronic device; and
in accordance with a determination that the user input was applied to the second input region, decrease an audio output volume of the electronic device.

5. The electronic device of claim 1, wherein:
the actuation segment comprises an electromagnetic element.

6. The electronic device of claim 5, wherein the actuation segment comprises a ferrous member and a conductive coil surrounding the ferrous member.

7. The electronic device of claim 1, wherein the beam structure is coupled to the input member via a third fastener extending through the beam structure on a first side of the actuation segment and via a fourth fastener extending through the beam structure on a second side of the actuation segment.

8. A portable electronic device comprising:
a touchscreen display;
wireless communication circuitry;
a battery; and
an enclosure enclosing the touchscreen display, the wireless communication circuitry, and the battery, the enclosure comprising:
a front cover positioned over the touchscreen display and defining a front exterior surface of the enclosure; and
a housing component coupled to the front cover and defining an opening along a side exterior surface of the enclosure; and
an input button assembly comprising:
a beam structure at least partially within the enclosure and comprising:
an actuation segment comprising an electromagnetic element and positioned proximate a middle of the beam structure;
a first compliant segment positioned proximate a first end of the beam structure; and
a second compliant segment positioned proximate a second end of the beam structure; and
an input member positioned at least partially in the opening and configured to impart a force on the beam structure as a result of an input applied to the input member;
a sensing system configured to detect a deflection of at least one of the first compliant segment or the second compliant segment; and
a processing system within the enclosure and configured to, in accordance with a determination that an output of the sensing system satisfies a condition, cause the electromagnetic element to deflect the beam structure, thereby moving the input member to produce a haptic output.

9. The portable electronic device of claim 8, wherein:
the condition is a first condition; and the processing system is configured to:
  in accordance with the determination that the output of the sensing system satisfies the first condition, cause the electromagnetic element to deflect the beam structure a first distance; and
  in accordance with a determination that the output of the sensing system satisfies a second condition different from the first condition, cause the electromagnetic element to deflect the beam structure a second distance greater than the first distance.

10. The portable electronic device of claim 9, wherein:
the first condition is indicative of the input member being depressed a third distance; and
the second condition is indicative of the input member being depressed a fourth distance greater than the third distance.

11. The portable electronic device of claim 8, wherein the sensing system further comprises:
  a first strain sensing element coupled to the first compliant segment; and
  a second strain sensing element coupled to the second compliant segment.

12. The portable electronic device of claim 11, wherein:
the input is a first input; and
the processing system is further configured to determine a swipe direction of a second input applied to the input member based at least in part on a first signal from the first strain sensing element and a second signal from the second strain sensing element, the second input including a swipe gesture extending along a surface of the input member.

13. The portable electronic device of claim 8, wherein causing the electromagnetic element to deflect the beam structure causes the beam structure to move the input member in a same direction as the input applied to the input member.

14. The portable electronic device of claim 8, wherein:
the input button assembly further includes a ferromagnetic structure; and
causing the electromagnetic element to deflect the beam structure includes causing the electromagnetic element to be magnetically attracted to the ferromagnetic structure.

15. An electronic device comprising:
a housing component defining a side surface of the electronic device;
a front cover coupled to the housing component;
a display positioned below the front cover;
an input button assembly comprising:
  a beam structure positioned within the electronic device;
  an input member positioned along the side surface of the electronic device and configured to:
    move inward a first distance in response to a force input applied to the input member; and
    cause a first deflection of the beam structure in response to the force input; and
  a haptic actuation system configured to, in accordance with a determination that the first deflection satisfies a condition, cause a second deflection of the beam structure, the second deflection configured to move the input member inward a second distance greater than the first distance.

16. The electronic device of claim 15, wherein the input member defines:
  a first input region at a first end of the input member;
  a second input region at a second end of the input member opposite the first end;
  a first post extending below the first input region and coupled to the beam structure; and
  a second post extending below the second input region and coupled to the beam structure.

17. The electronic device of claim 16, wherein the beam structure comprises:
  a first compliant segment rigidly coupled to the housing component;
  a second compliant segment rigidly coupled to the housing component; and
  an actuation segment between the first compliant segment and the second compliant segment.

18. The electronic device of claim 17, wherein the haptic actuation system comprises a conductive coil coupled to the actuation segment.

19. The electronic device of claim 17, wherein:
the first post is coupled to the beam structure via a first fastener extending through a first hole formed through the first compliant segment and the actuation segment; and
the second post is coupled to the beam structure via a second fastener extending through a second hole formed through the second compliant segment and the actuation segment.

20. The electronic device of claim 1, wherein the processing system is further configured to, in response to a determination that the user input was applied to the first input region, causing the input member to be moved to produce a haptic output.

* * * * *